(12) United States Patent
Gray

(10) Patent No.: US 6,665,877 B1
(45) Date of Patent: *Dec. 23, 2003

(54) UNDERGARMENTS PROTECTING AGAINST ELECTROSTATIC FIELD INDUCED TISSUE DEGRADATION

(76) Inventor: James R. Gray, 8816 Westwood Ave., Little Rock, AR (US) 72204

(*) Notice: Subject to any disclaimer, the term of this patent is extended or adjusted under 35 U.S.C. 154(b) by 83 days.

This patent is subject to a terminal disclaimer.

(21) Appl. No.: 10/016,360
(22) Filed: Nov. 30, 2001

Related U.S. Application Data

(63) Continuation-in-part of application No. 09/517,081, filed on Mar. 1, 2000, now Pat. No. 6,488,564.
(60) Provisional application No. 60/122,362, filed on Mar. 2, 1999.

(51) Int. Cl.$^7$ ................................................ A41D 13/00
(52) U.S. Cl. .................................................. 2/69; 2/400
(58) Field of Search .............................. 2/73, 78.1, 113, 2/115, 114, 109, 211, 243.1, 400, 401, 403, 406, 409, 902, 901, 455–457, 2.5, 46–48, 50, 51, 69, 70, 79, 83, 92, 44, 45, 463, 464, 468; 450/1, 43, 44, 40, 39, 94, 156, 30–32, 53–57, 93; 174/35 R, 356 C, 25 MC; 361/816, 818; 250/505.1, 515.1, 516.1, 519.1

(56) References Cited

U.S. PATENT DOCUMENTS

| | | | |
|---|---|---|---|
| 4,422,483 A | 12/1983 | Zins | |
| 4,471,015 A | * 9/1984 | Ebneth et al. | 174/35 R |
| 4,490,433 A | 12/1984 | Shigeru et al. | |
| 4,590,623 A | 5/1986 | Kitchman | |
| 4,684,762 A | * 8/1987 | Gladfelter | 174/36 |
| 4,703,133 A | * 10/1987 | Miller | 361/816 |
| 4,825,877 A | 5/1989 | Kempe | |
| 5,008,594 A | 4/1991 | Swanson et al. | |
| 5,017,876 A | 5/1991 | Wright et al. | |
| 5,073,984 A | * 12/1991 | Tone et al. | 2/DIG. 7 |
| 5,621,188 A | 4/1997 | Lee et al. | |
| 5,690,537 A | 11/1997 | Kalmus | |
| 6,488,564 B1 | * 12/2002 | Gray | 450/57 |

FOREIGN PATENT DOCUMENTS

GB 2 025 237 1/1980

* cited by examiner

*Primary Examiner*—Gloria M. Hale
(74) *Attorney, Agent, or Firm*—Stephen D. Carver

(57) ABSTRACT

Undergarments that protect from the detrimental interaction of electrostatic fields with human tissue. Filaments woven or knitted into patterns or into an insert attached to the undergarments may comprise electrically nonconductive strands and electrically conductive strands. Electrostatic field-concentrators provided upon particular strands create ions from adjacent air molecules and cancel electrostatic charges in their vicinity. The geometry of the preferred filaments is such that the field-concentrators are salient from the central bulk of the filament by a distance at least as great as the axial radius of the field-concentrator terminal surface. As a result, potentially detrimental electrostatic fields are reduced, and concomitant health benefits to the wearer are realized.

44 Claims, 6 Drawing Sheets

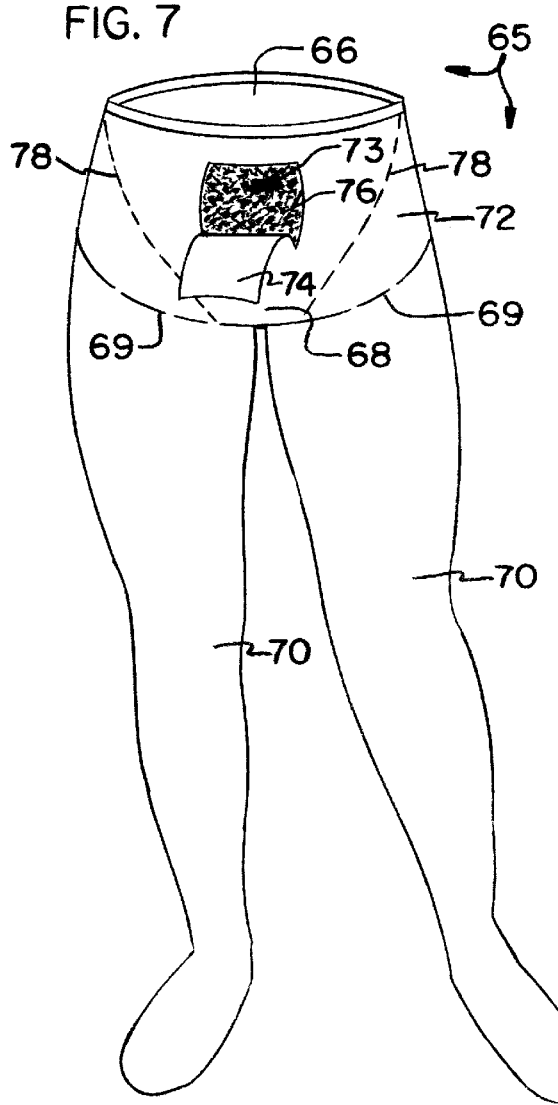
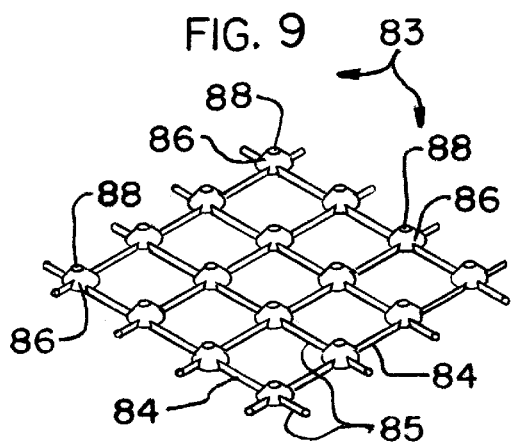
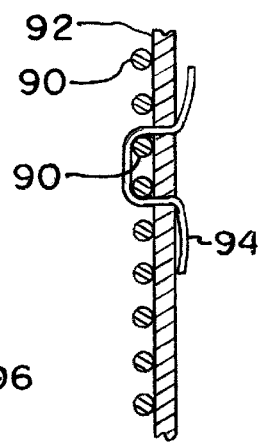
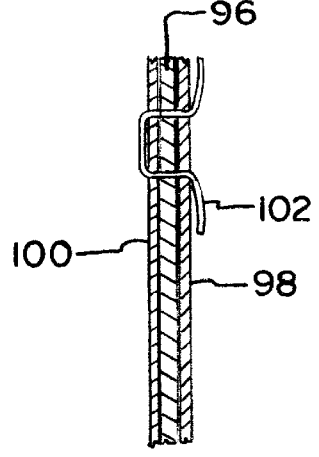
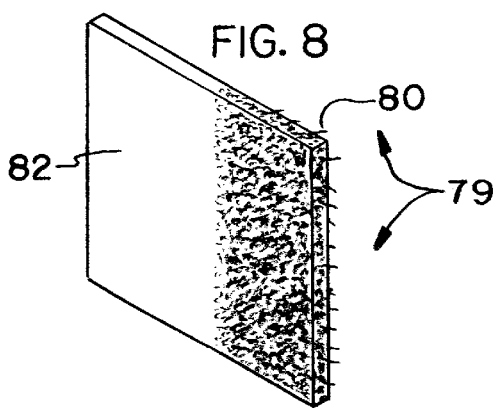

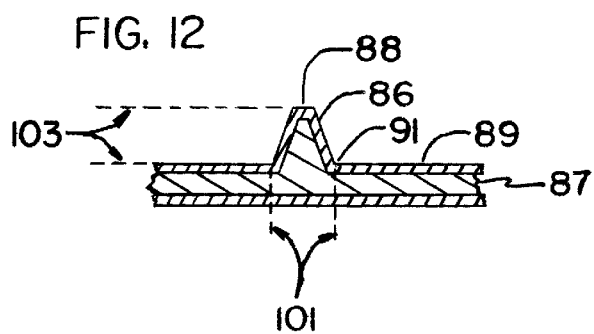
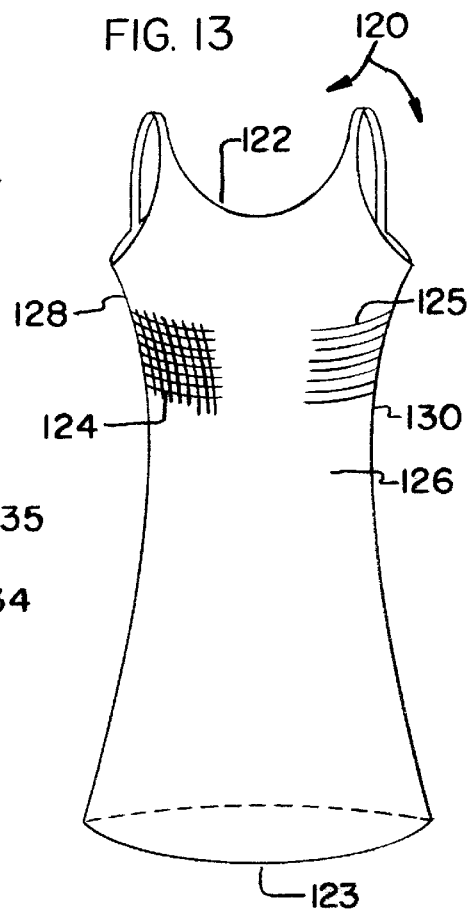
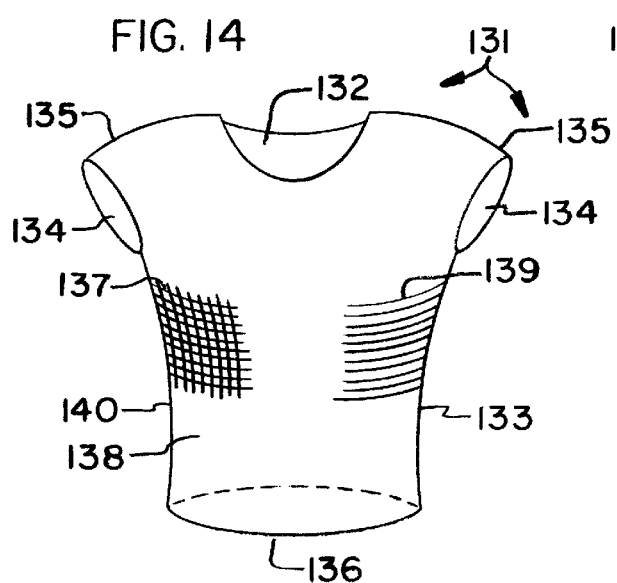
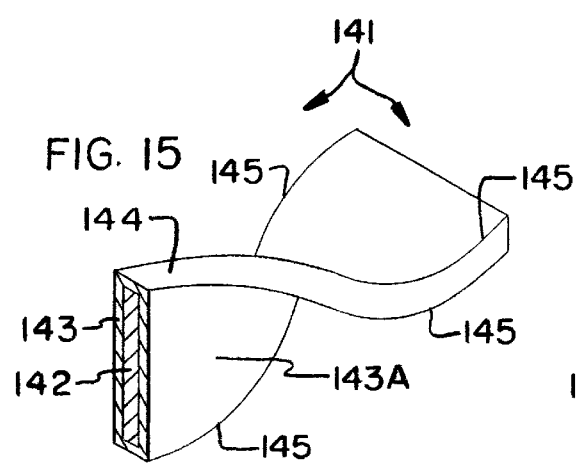
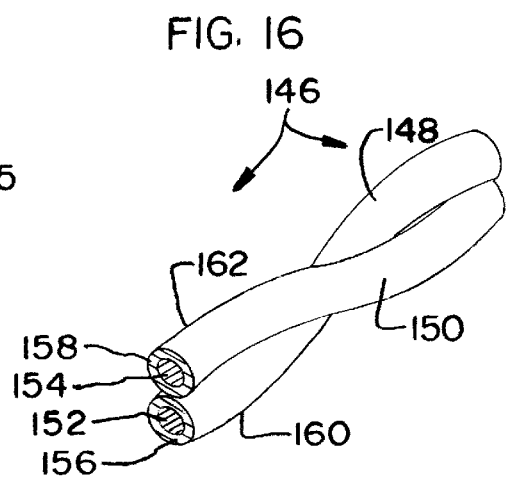

UNDERGARMENTS PROTECTING AGAINST ELECTROSTATIC FIELD INDUCED TISSUE DEGRADATION

CROSS REFERENCE TO RELATED APPLICATION

This application is a Continuation-in-Part of previously filed U.S. patent application Ser. No. 09/517,081, filed Mar. 1, 2000, entitled Brassiere Protecting Against Electrostatic Field Induced Tissue Degradation, now U.S. Pat. No. 6,488,564, issued Dec. 3, 2002, which is in turn based upon prior Provisional Application Ser. No. 60/122,362, filed Mar. 2, 1999, entitled Brassiere Protecting Against Electrostatic Field Induced Tissue Degradation, and all benefits of said prior filing dates are claimed.

In addition, there are two co-pending Continuation-in-Part patent applications from U.S. Pat. No. 6,488,564: Ser. No. 10/028,555, filed Dec. 21, 2001, entitled Fabrics Protecting Against Electrostatic Field Induced Tissue Degradation, and Ser. No. 10/028,645, filed Dec. 21, 2001, entitled Fiberfill and Fiber-Filled Articles Protecting Against Electrostatic Field Induced Tissue Degradation.

BACKGROUND OF THE INVENTION

I. Field of the Invention

The present invention relates generally to undergarments (underwear) at least partially worn on the body torso area in a first location next to the skin of the wearer. More particularly the invention relates to such items as panties (drawers), slips, and pantyhose similar to those typically worn by females, and underpants (drawers) and undershirts similar to those typically worn by males, which have been provided with structures that minimize the detrimental influence of electrostatic fields.

II. Description of the Prior Art

The body torso area of both adults and children is susceptible to several cancers of unknown origin. For example, rates of breast and ovarian cancers in females, and lung and prostrate cancers in males, are very high in the United States. Also, testicular cancers in male children have increased significantly over the past twenty years. The United States declared "war on cancer" approximately twenty-five years ago, and tremendous increases in research have occurred. Also, beneficial diet and lifestyle changes are becoming popular. Despite this, there has been a huge and unexplained increase in cancer incidence in general in the United States over the same period. Also, the rate of incidence of some cancers continues to increase. The cause for this increase has not been understood, but the rate of increased cancer incidence in general is so large, and so localized to the United States, that the Department of Health and Human Services has speculated that "U.S. citizens face a growing cancer risk from some as yet unidentified environmental factors".

The inventor has discovered, and conducted numerous rodent studies to confirm, that exposure to environmental electrostatic fields can directly promote cancer growth. Electric fields also can enhance the detrimental effects of chemicals on living tissue. This may be a large factor in the increased cancer incidence rates the U.S. is experiencing. Modern synthetic materials commonly used in clothing and other articles in the U.S., for example nylon panties rubbing against a polyester skirt, or polyester underpants rubbing against wool pants, can easily generate thousands of volts of electrostatic charge that produces strong electrostatic fields. In addition, our torso area is often exposed to strong electrostatic fields from electrostatic charges on surfaces other than our undergarments. For example, rubbing whatever we are wearing against synthetic upholstery, for example on a chair or car seat, can generate thousands of volts of electrostatic charge. Then, in the above examples, because of our extensive use of air-conditioning that keeps humidity levels low, electrostatic fields from these charges connect with the body tissue for hours at a time. Methods of protecting torso area and adjacent tissue from detrimental affect caused by exposure to electrostatic fields forms the basis of the present invention.

It is known that magnetic fields, and the magnetic portion of electromagnetic fields, can easily penetrate living tissue. This has been of concern over the past twenty years, with many studies conducted to evaluate the possibility of a causal link between electromagnetic fields and cancer. Yet, despite these years of research, very little affect from exposure to electromagnetic fields has been confirmed. Recent large animal studies in this area have again found no risk from exposure to these fields at the levels we commonly encounter them (Panel Finds EMF's Pose No Threat, Science 274:910, 1996, and Magnetic Field-Cancer Link: Will It Rest In Peace? Science 277:29, 1997).

On the other hand, relatively little consideration has been given to the possibility of electrostatic fields (which are different from electromagnetic fields) exerting influence inside a living body. The electrostatic charges that produce these fields commonly occur when two materials rub together, for example when our clothing rubs together or against another surface, or when two materials are placed together then separated, for example when we get up from a chair. All common garment and upholstery materials create electrostatic charges and fields under these conditions, but the charges created by natural materials are usually smaller than that from synthetic materials. As a result, humans are almost constantly exposed to electrostatic fields in our normal environment. Also, the field influence is typically very strong because of the close proximity of the charges to the body. For example, under conditions of low ambient humidity, rubbing panties or pantyhose against a skirt, or underpants against pants, can easily generate over 10,000 volts of electrostatic charge. Lower electrostatic potentials are almost always present around a person, even with moderate to high humidity.

However, unlike electromagnetic fields, electrostatic fields do not have a magnetic component and do not oscillate, so they have been assumed incapable of having influence inside living tissue. Quite to the contrary, the inventor has conducted numerous studies, using live animals, which leave no doubt that electrostatic fields can exert strong, and detrimental, influence inside living tissue.

As a result of the assumption that electrostatic fields do not have biological effects inside living organisms, there has been little research in the field. Several non-biological effects are known, however, and they have led to techniques for reducing electrostatic charges in certain situations.

One example of an undesirable non-biological effect of electrostatic fields is a tendency for a person who walks across a carpet when the humidity is low to generate and store electrostatic charges on the body. These charges can then be discharged into a computer or other piece of equipment that is touched, resulting in damage to the equipment. It is known that this problem can be reduced by coating the carpet fibers with an anti-static compound or by incorporating conductive materials within the carpet in order to allow charges to quickly flow back together, or to ground, as the carpet is walked upon. U.S. Pat. No. 4,490,433 illustrates structure that is an example of this technology.

Another undesirable non-biological effect is that the field from an electrostatic discharge may ruin modern electronic components during equipment manufacture. Some semiconductor devices can be damaged by an electrostatic discharge as low as thirty volts. As a result, the electronics industry is a leader in the use of a broad range of electrostatic charge prevention methods. The Electrostatic Discharge Association, 200 Liberty Plaza, Rhome, N.Y. 13440, an electronics industry association "dedicated to advancing the theory and practice of electrostatic discharge avoidance", has many publications available relating to electrostatic charge generation and elimination, and to test standards for the electronics industry. One known technique for reducing damage from electrostatic discharge is for assembly workers and others who handle sensitive components to wear conductive work garments (such as lab coats or jump suits) with grounding leads to drain off electrostatic charges. Similarly, conductive lab coats, etc., are used to prevent electrostatic sparks in areas where explosive gases are present. U.S. Pat. Nos. 4,422,483 and 4,590,623 show examples of this technology.

Another technique for reducing damage from electrostatic discharge relates to ion generators that can cancel electrostatic charges on surfaces. Generators of this type typically use high-voltage corona discharge, or nuclear (alpha particle) energy, to ionize air molecules. These systems produce and blow negative and positive ions into the air, where they are attracted to combine with and cancel electrostatic charges in the vicinity. U.S. Pat. Nos. 5,008,594 and 5,017,876 show examples of this technology.

Attempts to protect the body from electric fields in general are also shown in the prior art. The methods generally involve covering the body area desired to be protected with a shielding layer in the form of metal or other conductive material. UK patent GB 2,025,237, and U.S. Pat. Nos. 4,825,877, 5,621,188 and 5,690,537, show examples of this technology. Some of these references principally address shielding electromagnetic fields, which are completely different from static electric fields. The references that mention electrostatic fields make the erroneous assumption that a conductive shielding layer will stop electrostatic field influence as well as it does electromagnetic field influence.

The requirements for minimizing the influence from electrostatic fields are substantially different than those required for electromagnetic fields. A conductive shielding layer will block passage of an electromagnetic field because as the oscillating field impacts the conductive layer it induces currents that produce electric and magnetic fields in the layer. As these fields are created, they reinforce the electromagnetic field on the incident side of the layer, but are out of phase with, and oppose and cancel, the field on the other side of the layer.

To the contrary, simply placing a conductive layer between an electrostatic charge and a body area to be protected will not stop electrostatic field influence from reaching the body. Electrostatic fields do not oscillate so they do not produce oscillating electric current that opposes the impacting field. The passage of electrostatic fields through a conductive material is shown by the physics "Superposition Principle" which states "The net electric force on a charged object is the vector sum of the individual electric forces on the object due to all other charged objects. Each individual interaction is unaffected by the presence of other charges". A good explanation of this principle and its ramifications can be found in the book *Electric & Magnetic Interactions*, R. W. Chabay and B. A. Sherwood, John Wiley & Sons publishers, 1995. As shown by the Superposition Principle, the presence of conductive material between an electrostatic charge and an object (the human body for example) does not stop electrostatic field influence from reaching the object.

This can be demonstrated by placing a solid aluminum or steel plate between a piece of charged cloth and an electrostatic field meter, with the meter serving as the body area to be protected. Even a 2.5-cm (1-inch) thick intervening conductive plate will at best reduce the field influence by only around one-half to two-thirds. It does not stop the field and its influence is still detected by the electrostatic field meter (body). We of course cannot wear 2.5-cm thick steel plates on our body, but even reducing common electrostatic field intensity by two-thirds cannot be expected to protect the body from detrimental electrostatic field influence. For example, a 5,000-volt electrostatic charge (which is common) on a 1-cm diameter area of a clothing article 0.5-mm from the body of the article wearer exposes the body area next to the charge to an electrostatic field intensity of over 900,000 volts per meter (V/m). Reducing this field by even two-thirds would still expose the body to a field intensity of 300,000 V/m. The inventor's animal studies have shown that an electrostatic field just one-fourth as intense as 300,000 V/m can strongly promote cancer growth.

Also, electrically connecting an intervening conductive plate, or other conductive material as noted in the prior art, to the body of a wearer, cannot be counted on to stop electrostatic field influence. Electrically, this simply creates a static conductive object (the conductive material) in contact with a dynamic conductive object (the body of the wearer) so that one side each of the combination of static object/conductive object is exposed. Electrostatic field influence will then polarize and pass through the static conductive object and dynamic conductive object as it continually tries to bring the charges in each to a point of static equilibrium.

It is also important to note that wearing a protective article that simply drains static electric charges cannot be counted on to stop electrostatic field influence on the body. For example, wearing a torso area undergarment incorporating an electrically conductive material to simply drain static electric charges from the undergarment to the body could move some charges from the undergarment surface. However if a skirt, pants, or other nonconductive article worn next to the undergarment became charged, these charges would not be removed. Electrostatic field influence from these charges would then pass through the undergarment and connect with the torso tissue. This also would not protect the conductive undergarment wearer's torso tissue from static electric fields generated on other nearby articles, such as those generated on the upholstery of a chair, or car seat, for example.

In summary, although the prior art teaches conductive shielding placed next to the body, or dissipating static charge by draining, etc., the prior art does not teach torso area undergarments that minimize detrimental influence of electrostatic fields on torso tissue by creating air ions to cancel electrostatic charges at the source generating the fields on both the undergarments and other charged surfaces in the vicinity.

The inventor has used in vivo studies to conclusively demonstrate that electrostatic fields can exert strong influence inside a living body, directly affecting cell operation and also strongly increasing the detrimental effect of chemicals on cells. Protecting tissue and organs of the torso area, which can be particularly prone to cell damage, from these fields is very important. This can result in reduced cancer rates, and lives saved.

The inventor's animal studies have demonstrated that electrostatic fields can strongly influence cells inside living tissue, and have also shown a direct connection between these fields and cancer growth. These are the same fields created when our clothes rub together or rub against other surfaces and create the static electric charges that generate electrostatic fields. Viewed at this level, electrostatic charges and fields may seem to be simple nuances. Nothing could be farther from the truth. Electrostatic charges and fields are the most complicated, and most important things on this earth. In fact, the interactions of these charges and fields are responsible for everthing on this earth, including life.

Wearing two layers of clothes can further enhance the generation and trapping of electrostatic charges, and thus increases exposure of nearby body areas to electrostatic fields from these charges. Significantly, the areas of the human body where cancer incidence is increasing most are almost all areas where two layers of clothes are normally worn. In breast cancer for instance, almost two-thirds of the tumors occur in the upper/outer quadrant and nipple area of the breast, even though the tissue is substantially the same in the other quadrants. This is the exact area where a bra and outer garment, such as a blouse or jacket for example, are in most intimate contact and where the surfaces of the bra and outer garment, or the surfaces of other outer garments, rub together most during normal movement to generate static electric charges and thus fields.

The inventor's research has shown that the present invention is important in regard to cancer growth prevention, however, it may well be just as important in regard to disease prevention. It is now known that more than half, and possibly as much as eighty percent of all diseases, ranging over such diverse areas as diabetes to cancer, is caused by genetic damage. The human genome in each cell is estimated to contain over 30,000 genes connected end-to-end. The specific DNA sequence is duplicated each time the cell divides. The gene damage responsible for disease occurs because of a point mutation, deletion, translocation or rearrangement in the DNA sequence of normal genes. For example, researchers have found that there can be up to thirty-eight such mutations in the BRCA1 gene, which results in an eighty-five percent chance of developing breast cancer. The fact that all genes are first assembled, and then connected together in the DNA strand, by natural electrostatic fields within the cell points to the real possibility that electrostatic fields exerting influence from sources outside the body may be able to alter the force of the body's natural electrostatic fields enough to cause a miss, or missed, connection as the DNA strand is assembled.

III. Biological Degradation Theory

The following theoretical discussion is offered in an effort to aid in understanding and practicing the invention. However, it must be recognized that our knowledge of cellular operation at the molecular level is incomplete. The theoretical discussions contained herein are therefore not intended to be limiting on the invention in any manner.

The findings of the inventor's studies involving electrostatic field influence inside living tissue are surprising and not predicted. As shown by Gauss's law, there can be only zero electric field inside a conductive object in static equilibrium. It has therefore been easy to assume that the conductive nature of a mammalian body acts as any simple conductive object, with external electrostatic fields causing polarization and a shift in charges to achieve a point of equilibrium resulting in zero field influence inside the object. The inventor's study findings demonstrate that a mammalian body reacts with an electrostatic field in a much different way than with a simple conductive object. In retrospect, Gauss's law actually points to this because a mammalian body is known to contain and use countless continually changing internal electric fields as it constantly adds, releases, binds, and moves charged molecules to cause and control normal cell operations. It therefore cannot be considered to be a simple conductive body addressed by Gauss's law. Also a mammalian body is highly nonhomogeneous and not a perfect, or uniform, electrical conductor. In fact the electrical resistivity of mammalian tissue varies enough that electrical impedance tomography is now being developed as a non-invasive imaging and diagnostic method It may be that one, or a combination, of these two factors is the key to the electrostatic field effects in the inventor's animal studies. The dynamic nature, and nonuniform conductivity, of a mammalian body may prevent the body from ever reaching a point of true static equilibrium. Therefore an imposed electrostatic field would not fall to zero at the surface as it would for a simple static conductive object. The electrostatic field would of course be reduced, but unless it drops to zero it could attract or repel normal cell charges and fields inside the body enough to affect cell operation.

As a direct example, the circulatory system continuously moves ionic fluid through the space between cells. Although the bulk of this movement can be relatively fast, it is known that a layer of fluid, which can extend 50 sum or more out from cell membranes, remains almost "unstirred". Ions influenced by the applied electrostatic field to slightly move from the bulk fluid to this stagnant layer would accumulate there, and would be very close to the cell membrane. Their combined field influence could then alter the existing transmembrane potential and surface charge density, thus opening a number of possibilities for reaction, migration of cell surface macromolecules, and transport of material across the lipid bilayer. It is likely that the electrostatic field influence applied to molecules of the moving interstitial fluid would be extremely small. However, movement of ions from the bulk fluid to the stagnant layer next to cell membranes would be accomplished by changing the direction of the velocity of the ions without directly changing the magnitude of the velocity. Thus no expenditure of energy (work) would be required from the field.

It is also known that the effect of migration of cell surface macromolecules may be transferred to the cell nucleus via microtubules and intermediate filaments spanning to the nucleus from many of these molecules. This identifies another danger from exposure to electrostatic fields. We now believe that almost all cancer is the result of a mutation in cellular DNA. As a cell prepares to divide, its DNA is duplicated so the original and progeny cells both end up with DNA strands. Cell cycle times vary, but consider a rather common time of 27 hours between cell divisions. During this period the cell goes through four phases in preparation to divide. DNA is replicated during the S phase of the cycle, in this case a time interval around 10 hours. During this period over 30,000 genes are moved from compartments in the cell and assembled, in the proper end-to-end sequence, to form the duplicate DNA strand. This is a high-speed assembly line driven by natural electric charges and fields within the cell, and also the DNA is held together by natural electric charges. An unnatural electrostatic field influence (and that is what the inventors studies have demonstrated) could result in a miss, or missed, connection in the DNA strand. Of additional interest, it has been speculated that the majority of all major noninfectious disease is the result of DNA abnormalities. This includes a broad range of disease types, from Alzheimer's to obesity for example.

IV. Environmental Electrostatic Fields

The inventor's in vivo studies leave little doubt that electrostatic fields can promote cancer growth. There is also reason to believe these fields may be able to initiate cancer, either by directly causing DNA damage, or by increasing the effect of environmentally encountered chemicals on cells. Protecting body areas known to be particularly susceptible to damage, such as the torso area, from uncontrolled exposure to these fields is very important. Yet, our modem world has created an environment that favors generating and holding the static charges that create these fields. The United States has led the world in the increasing use of synthetic materials in our clothes and on other surfaces around us, and these are the dominant materials with which we now live. Polyester, nylon, acrylic and polyolefins, for example, are much better static charge generators than natural fibers. Also, unlike natural fibers, synthetic materials are usually hydrophobic and do not wick moisture from the air, or our skin, to provide conductive paths through which the charges can drain. In addition, over the past 20 years, the United States has led the world in the increasing use of air conditioning. This keeps the humidity of our environment low and favors the generation and holding of static charges over long periods of time. Humans are therefore almost constantly exposed to electrostatic fields from both our clothes and other surfaces around us.

As an example, the inventor has measured electrostatic charges generated by various activities at fifty percent relative humidity, and has found for example that removing a nylon jacket, while wearing a polyester shirt can leave a 1,980 volt charge on the center of the shirt's front surface, and a 6,000 volt charge on the center of the shirt's rear surface; that removing a rayon lined jacket, while wearing a silk blouse, can leave a 600 volt charge on the center front of the blouse, and a 4,300 volt charge on the center back of the blouse; and that getting up from a nylon upholstered chair while wearing polyester pants can leave up to 10,000 volts on the seat of the pants.

The fact that these electrostatic charges are typically very close to the garment wearer's body exposes the body to very strong electrostatic fields. For example the inventor has demonstrated that rubbing nylon panties against a polyester skirt can easily generate over 5,000 volts of electrostatic charge that can be less than 0.5 mm from the pelvis. A 5,000-volt electrostatic charge of just 1-cm diameter, 0.5-mm from the pelvis, exposes the pelvic tissue to an electrostatic field intensity over 900,000 V/m. This is a field 3 ½ times stronger than the field the animals in the following Study Example D were exposed to.

Without doubt, electrostatic charges ranging from hundreds to thousands of volts are almost always present on the surface of clothes we are wearing, and on surfaces we are rubbing against, even under relatively high humidity conditions. Charges on human skin are not of concern because they are able to disperse or drain along the relatively conductive surface of the skin, whereas charges generated on the surface of clothes, plastic covered chairs, etc. are trapped on the relatively nonconductive surface of the material. These charges can remain in place very near the body, with their electrostatic fields connecting to the body, for hours at a time.

SUMMARY OF THE INVENTION

The present invention is directed at protecting the body torso area from detrimental influence from electrostatic fields by the use of specially constructed panties, pantyhose, underpants (intended to include undershorts), slips, undershirts, and the like, (sometimes referred to herein simply as "undergarment", "undergarments", or "torso area undergarments"), which react to impinging electrostatic fields by creating ions in the air that intercept the fields and move to cancel the electrostatic charges creating the detrimental field.

Undergarments in the present invention are typically at least partially worn in a first location next to the body, cover at least a portion of the torso of the wearer, and are configured to conform generally with at least a part of the body area covered by the undergarments. The undergarments utilize electrically conductive electrostatic field-concentrators (sometimes referred to herein simply as "field-concentrators" or "concentrators", or "concentrator"), at spaced-apart locations that operate to generate ions in the air that intercept the field and move to and cancel electrostatic charges in the vicinity. A conductive body, or bodies, comprising a plurality of field-concentrators exists on or within the structure of the undergarments. The field-concentrators are formed as a plurality of salient areas on one or more conductive bodies of material, on or within the structure of the undergarments.

In the best mode, the conductive body or bodies of the undergarments comprise preferred concentrator bodies at spaced-apart locations with outermost boundaries that are characterized by an electrically conductive field-concentrator terminal surface, most commonly an end or edge (with the term "edge" intended to include "side"), salient from the immediate longitudinal aggregation of the conductive body or bodies by a distance at least greater than, and preferably two times or more greater than, one-half the axial width of the terminal surface. In an alternate method, an electrically conductive filament comprises at least one electrostatic field-concentrator, most commonly an edge, side, or end, having at least one outermost terminal surface area that is salient from the central bulk of the conductive material by a distance at least as great as the radius of the terminal surface. Most preferably, in the alternate method the terminal surface is salient from the center of the central bulk of the conductive material by a distance at least greater than, and preferably two times or more greater than, the radius of the concentrator terminal surface.

These field-concentrators attract impinging electrostatic fields to preferentially connect with the conductive material of the concentrators. This causes the fields to crowd closely together on the concentrators, which in turn increases the field intensity to a point that causes nearby air molecules to separate into positive and negative ions. The ions carrying a charge opposite that of the charges generating the electrostatic field intercept the field and are then attracted toward those charges, and the ions combine with and cancel the electrostatic charges generating the field. Thus undergarments under the invention, without requiring grounding or other common methods, can not only intercept electrostatic fields, but can also stop electrostatic fields at their source even if the source is not directly on the material of the undergarments but is instead on another surface, such as a skirt or shirt for example. This can help protect both tissue covered by the structure of the undergarments, and also even adjacent tissue not covered by the undergarments, from detrimental influence from these fields. This is important because many popular undergarment designs do not cover all of the torso area tissue.

Undergarments in a preferred method of the invention will be principally formed from nonconductive material for comfort and low cost but will incorporate a plurality of conductive electrostatic field-concentrators, for example as part of a yarn, filament, strand, stratum, etc., at spaced-apart locations. The nonconductive material may be any material suitable to construct undergarments of the desired design. Such materials are well known in the garment industry, and examples would include fabrics as well as nonwoven, cast, and extruded materials. Bodies of conductive material comprising electrostatic field-concentrators may be incorporated on or within the nonconductive material of the undergarments. In some methods of the invention, the bodies of conductive material comprising electrostatic field-concentrators may be supported by nonconductive material placed on or within the undergarments.

The inventor has used in vivo animal studies to conclusively demonstrate that electrostatic fields can exert strong influence inside a living body, directly affecting cell operation and also strongly increasing the detrimental effect of chemicals on cells. Protecting the torso area, which can be particularly prone to cell damage, from these fields is very important. This can result in reduced disease, and lives saved.

OBJECTS AND ADVANTAGES

Accordingly, the present invention has several objects and advantages. For example:

(a) to provide inexpensive, comfortable, and nonobtrusive torso area undergarments which can minimize detrimental effects on healthy tissue, such as tissue of the breast, chest, abdomen, and pelvic areas for example, caused by exposure of the tissue to electrostatic fields;

(b) to aid people who have already been a victim of torso area disease, or who have a familial predisposition to torso area disease, in using undergarments which avoid detrimental effects from exposure to electrostatic fields.

(c) to provide torso area undergarments which can also help protect areas adjacent to the body area covered by the undergarments from detrimental effects of electrostatic fields.

These objects, as well as other objects which will become apparent from the discussion that follows are achieved, according to the present invention, by providing specially constructed undergarments, such as for example drawers (panties, underpants, undershorts, etc.), pantyhose, slips, undershirts, and the like, which react to impinging electrostatic fields by creating air ions to intercept the fields and move to cancel electrostatic charges on the undergarments, and also on other surfaces in the vicinity, to protect torso area tissue from detrimental electrostatic field influence.

BRIEF DESCRIPTION OF THE DRAWINGS

In the following drawings, which form a part of the specification and which are to be construed in conjunction therewith, and which like reference numerals have been employed throughout wherever possible to indicate like parts in the various views:

FIG. 7 is a fragmentary perspective view of pantyhose wherein a layer of material comprising field-concentrators is placed behind nonconductive material in the pelvic area;

FIG. 8 is an enlarged, fragmentary, perspective view showing conductive material comprising field-concentrators suitable for use as at least one layer in torso area undergarments described herein;

FIG. 9 is an enlarged, fragmentary, perspective view of an alternative grid arrangement of field-concentrators suitable for use according to the invention;

FIG. 10 is an enlarged, fragmentary, cross-sectional view of a portion of an undergarment showing field-concentrators on the outside surface with a conductive filament extending through the garment to electrically connect with the wearer's body;

FIG. 11 is an enlarged, fragmentary, cross-sectional view of a portion of an undergarment showing how material comprising field-concentrators may be sandwiched between layers of nonconductive material, and showing a conductive filament extending through the garment to electrically connect with the wearer's body;

FIG. 12 is an enlarged, fragmentary, sectional view of part of a grid and one of the field-concentrators of FIG. 9;

FIG. 13 is a perspective view of a slip constructed in accordance with the invention, wherein filaments comprising field-concentrators arranged in a grid are shown on the left side, and parallel filaments comprising field-concentrators are shown on the right side, and wherein the spacing between adjacent filaments is exaggerated by enlargement for clarity;

FIG. 14 is a perspective view of an undershirt constructed in accordance with the invention, wherein filaments comprising field-concentrators arranged in a grid are shown on the left side, and parallel filaments comprising field-concentrators are shown on the right side, and wherein the spacing between adjacent filaments is exaggerated by enlargement for clarity.

FIG. 15 is an enlarged, fragmentary, perspective view of an alternative filament comprising a substantially flat, nonconductive layer coated with conductive material to form field-concentrators along the edges, with portions thereof shown in section for clarity;

FIG. 16 is a fragmentary, perspective view of an alternative filament comprising a pair of strands with a substantially round cross section, each strand having nonconductive material coated with conductive material to form field-concentrators along the edges, with portions thereof shown in section for clarity;

DETAILED DESCRIPTION

Figure 1:
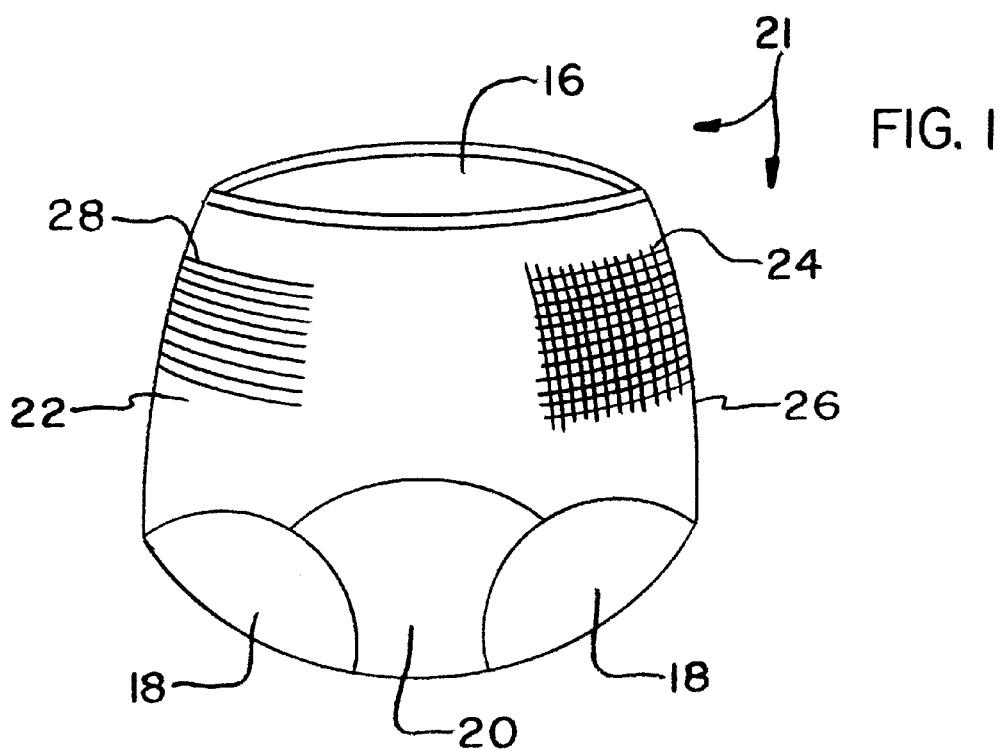
FIG. 1 is a perspective view of a panty undergarment for female wear constructed in accordance with the invention, wherein filaments comprising field-concentrators arranged in a grid are shown on the right side, and parallel filaments comprising field-concentrators are shown on the left side, and wherein the spacing between adjacent filaments is exaggerated by enlargement for clarity.

Referring now to the drawings, FIG. 1 shows an undergarment 21 in the form of a panty (panties). The undergarment includes filaments comprising electrostatic field-concentrators defined at spaced locations within or upon the standard weave or knit of a fabric.

As used herein, the term "filament" is intended to include lengths of individual material as well as lengths of composite material such as staple fiber yam and the like, and also lengths of plied or twisted together individual and/or composite material. Any of the filament lengths may range up to continuous. The term "strand" as used herein is intended to include short lengths of individual material, short lengths of composite material, and also short lengths of plied or twisted together individual and/or composite material.

Undergarment 21 comprises a panty top opening 16, lower leg receiving openings 18, a crotch portion 20, and a body encircling portion 22 connecting between the crotch portion, leg receiving openings, and the top opening. The combination of body encircling portion 22 and crotch portion 20 are considered herein to be a torso portion of the undergarment. Filaments comprising field-concentrators may be used to construct the entire panty. However, as a cost saving method, filaments 24 or 28 comprising field-concentrators are preferably applied in a pattern instead of as a solid, relatively unbroken surface, stratum, etc. Only small areas of filaments 24 and 28 are shown for clarity. Although the same pattern of filaments would commonly be used throughout the majority area of the panty, two pattern examples are show here, with filaments 24 on the right side 26 of undergarment 21 (FIG. 1) arranged in a grid, and with filaments 28 on the left side arranged as parallel lines.

If the spacing used for filaments 28 is larger than around 5-mm, a grid pattern is preferred because it provides more concentrators. In a preferred embodiment, filaments 24 or 28 will be approximately the same diameter (or cross-sectional shape) as the nonconductive filaments included in the weave or knit of the fabric. However, filaments 24 or 28 may be a smaller diameter if it is desirable to camouflage the filaments, or larger diameter if it is desirable to plainly show the filaments with the nonconductive filaments included in the weave or knit of the fabric. Also in a preferred embodiment, the majority of the filaments 24 or 28 comprising concentrators, and/or the majority of concentrators, will have at least one path of electrically conductive connection with the wearer's body. This helps the concentrators maintain optimum conditions to quickly create air ions to cancel electrostatic charges in the vicinity and minimize detrimental electrostatic field influence on the wearer's torso area. Filaments comprising concentrators can also be used to construct the entire panty, but if it is desirable to space the filaments (as a cost saving method for example) a spacing around 1 to 10-mm is preferred, with around 6-mm or less more preferred, but is shown enlarged for clarity.

Several types of filament comprising concentrators are suitable for panty 21, and the type chosen will depend to a great extent on the production capabilities of the manufacturer, desired cost, and desired appearance of the panty. Examples of suitable filaments include those shown in FIGS. 3–6, and 15–16, which are discussed hereinafter.

Figure 2:
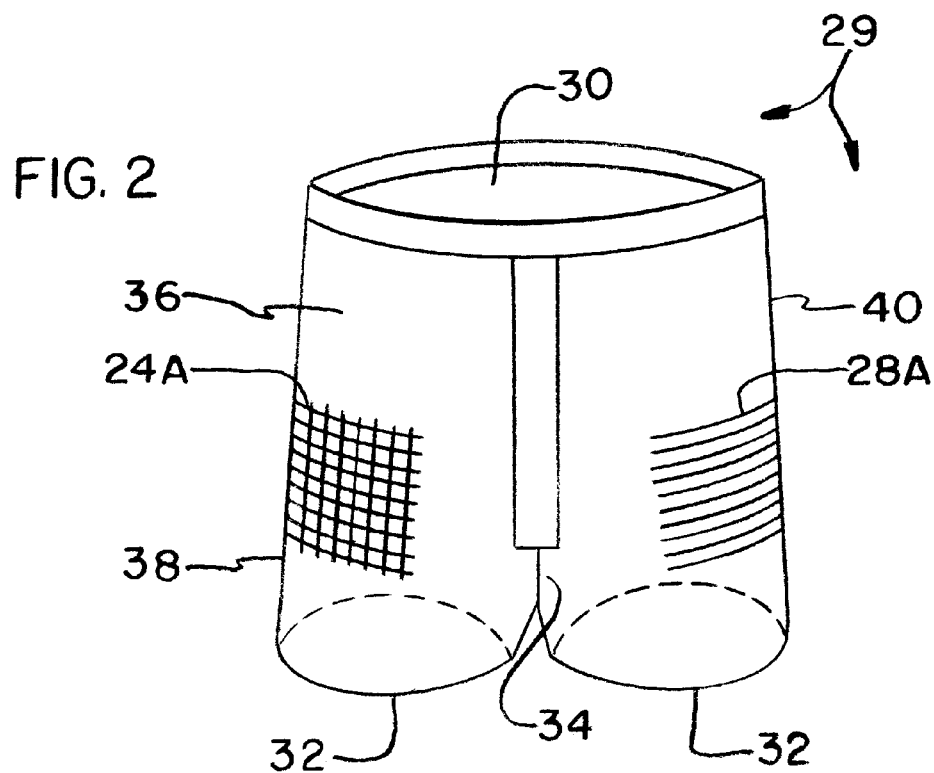
FIG. 2 is a perspective view of underpants for male wear constructed in accordance with the invention, wherein filaments comprising field-concentrators arranged in a grid are shown on the left side, and parallel filaments comprising field-concentrators are shown on the right side, and wherein the spacing between adjacent filaments is exaggerated by enlargement for clarity.

FIG. 2 shows an alternative undergarment 29 comprising underpants incorporating filaments. Again, the filaments comprise numerous electrostatic field-concentrators defined at spaced locations within or upon the standard weave or knit of the constituent fabric. The preferred undergarment 29 comprises a top opening 30, lower leg receiving openings 32, a crotch portion 34, and a body encircling portion 36 connecting the crotch portion, leg receiving openings, and top opening. The combination of body encircling portion 36 and crotch portion 34 are considered herein to be a torso portion of the undergarment. Filaments comprising field-concentrators may be used to construct the entire under pant. However, to reduce costs, filaments 24A or 28A comprising field-concentrators are applied in a localized pattern. Only small areas of filaments 24A and 28A are shown for clarity. Although the same pattern of filaments would commonly be used throughout the majority area of the under pant, two pattern examples are show here, with the filaments 24A on side 38 arranged in a grid, and the filaments 28A on the right side 40 arranged in parallel lines. If the spacing used for filaments 28A is larger than about 5-mm, the grid pattern is preferred.

In a preferred embodiment, filaments 24A or 28A will be approximately the same diameter (or cross-sectional shape) as the nonconductive filaments included in the weave or knit of the fabric. However, the filaments may be a smaller diameter if it is desirable to camouflage the filaments, or a larger diameter if it is aesthetically desirable to visibly highlight the filaments. Also in a preferred embodiment, the majority of the filaments 24A or 28A comprising concentrators, and/or the majority of concentrators, will have at least one path of electrical connection with the wearer's body. This helps the concentrators create air ions to cancel electrostatic charges in their vicinity, to thus minimize the detrimental electrostatic field influence on the wearer. Filaments comprising concentrators can be used for the entire undergarment 29, but for cost minimization it is desirable to space apart adjacent filaments between 1 to 10-mm, with a 6-mm or less spacing more preferred. Several types of filament comprising concentrators are suitable, and the type chosen will depend upon factors such as the production capabilities of the manufacturer, the target cost, the garment size, and the desired appearance. Examples of suitable filaments include those shown in FIGS. 3–6, and 15–16 discussed later.

Figure 3:
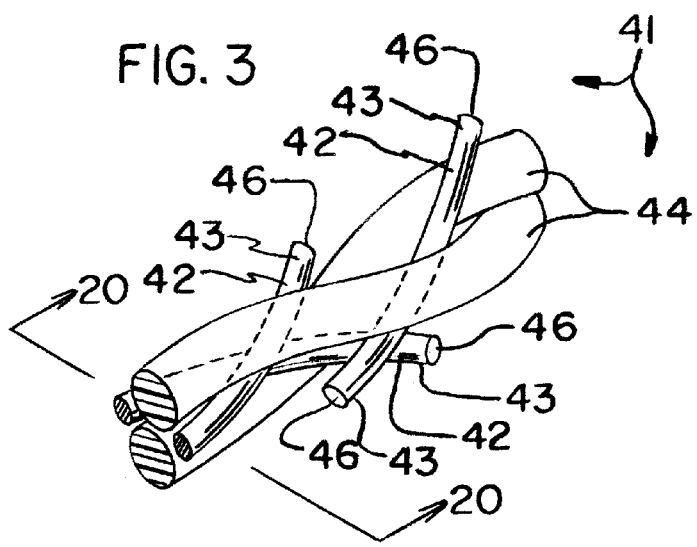
FIG. 3 is an enlarged, fragmentary, perspective view of a preferred filament in which lengths of conductive strands comprising field-concentrators are twisted with nonconductive strands, with portions thereof shown in section for clarity.

Referring to FIG. 3, a preferred filament generally designated by the reference numeral 41, is suitable for undergarments such as those seen in FIGS. 1, 2, 7, 13 and 14, for example. Filament 41 may be used to produce fabric for undergarments, or can be directly knitted or otherwise formed in the desired shape of an undergarment. Filament 41 comprises short lengths of small cross-section, electrically conductive strands 42 twisted with at least one nonconductive strand 44 to form the composite filament 41. Strands 42 and/or 44 may be crimped in several locations to help them remain in place in the twisted filament, or if needed an adhesive, such as Thread Fuse™ for example, may be applied along with the other components to hold the filament together. Conductive strands 42 can be any length to meet the needs of a specific undergarment design, however they are usually between 20-mm to 100-mm long. A length of around 40-mm is preferred to provide a great number of concentrators along the length of the filament. Although the filament may be produced completely from conductive strands, some of which have their ends salient to provide concentrators at spaced-apart locations, it generally saves cost to combine conductive strands along with nonconductive strands. In this regard, it is preferred that conductive strands 42 be placed in the filament at concentrations of around 1% to 50% by weight, but more preferred that the conductive strand concentration be around 20% or less of the filament to save cost.

Conductive strands 42 will typically be around 0.5 to 50 denier, with around 8 denier or less more preferred because smaller sizes can more strongly concentrate charges at the concentrator location, and thus more strongly concentrate electrostatic fields there to produce a large number of air ions. The nonconductive strand or strands 44 may be the same, or of different size than strands 42, and also may be of short or continuous lengths. A plurality of strands 42 comprise concentrator bodies 43 with terminal surfaces 46 presenting field-concentrators that occur at spaced-apart locations along the length of the larger filament body. Filament 41 may also be plied with one or more other filaments of the same type if it is desirable to increase the number of conductive strands of the filament for a specific use, or plied with one or more filaments of other types that may or may not be conductive.

Figure 20:
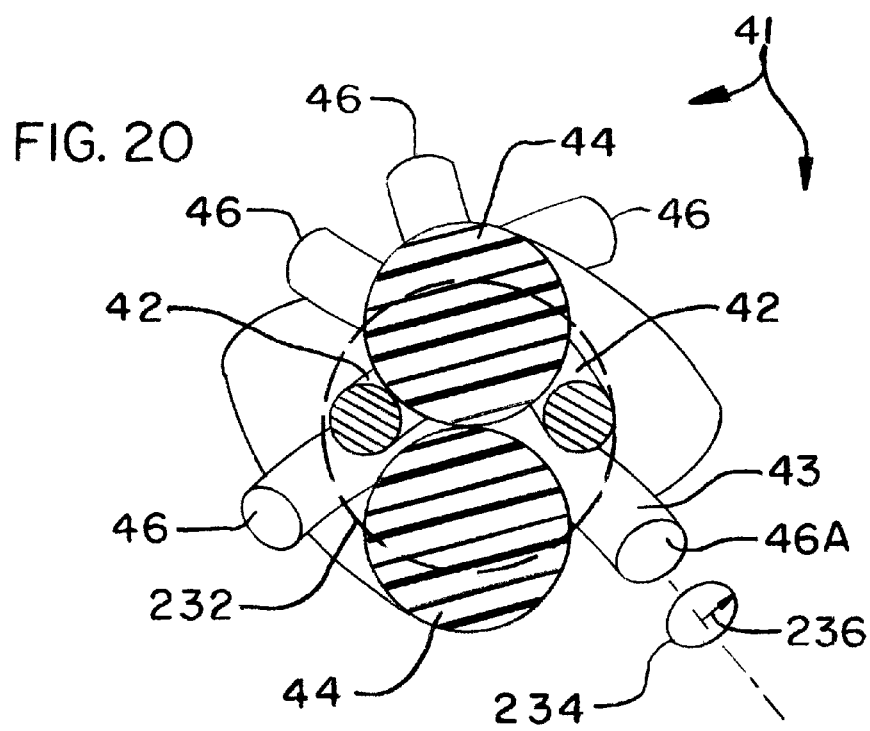
FIG. 20 is a fragmentary, diagrammatic sectional view taken generally along lines 20—20 in FIG. 3 at a point where the composite filament diameter is minimal, illustrating characteristics of a preferred type of filament such as those shown in FIGS. 3, and 8.

Concentrator terminal surfaces 46 are salient from the immediate longitudinal aggregation of the conductive material of the filament. In other words, the concentrators are structurally distinct from the longitudinal aggregation of conductive strands of the composite filament 41, and they project away from the filament's longitudinal axis. They present spaced-apart, structural anomalies that are desired for electrostatic voltage concentration. As explained later, and as illustrated in FIG. 20, it is preferred that the concentrators extend outwardly away from the immediate longitudinal aggregation of the conductive strands of the filamentary structure 41 by a distance at least greater, and preferably two or more times greater, than the radius of the concentrator terminal surface. The electrostatic field concentration is generally strongest on the concentrator body at the surface most distant from the conductive bulk of the filament. FIG. 20 illustrates principles involved in the preferred design of filaments of this type.

Prototypes of filaments 41 were tested in a preferred embodiment of an undergarment under the invention. Separate 37-mm long conductive strands of 3 denier, carbon black coated acrylic were twisted together with nonconductive strands of acrylic of approximately the same size to form a continuous filament of about 400 denier. The conductive strands comprised about ten percent of the filament (by weight), and the conductive strands were staggered so the majority were in electrical connection with each other. A plurality of the conductive strand ends were positioned to be salient from the electrically connected bulk of the strands, and also occur at an average of around 6-mm or less of the filament length to insure the generation of a large number of air ions in the presence of impinging electrostatic fields. The completed filament was then placed as parallel lines 3.5-mm apart in the knit of a common polyester fabric. The polyester fabric/filament combination was used to construct an under pant similar to that shown in FIG. 2 (29).

To test the ability of the garment to protect a wearer from electrostatic fields, a 19-mm. wide and 125-mm. long piece of polyester plastic was electrically charged to potentials ranging from 5,000 to 15,000 volts. An electrostatic field meter was then placed in the garment (to serve as torso area tissue), and the garment was held next to the charged plastic to determine how well the construction prevented electrostatic fields from reaching the meter (torso tissue). At all voltages, the preferred construction attenuated the field influence by one-hundred percent in less than one second. The inventor's tests also demonstrated that the under pant canceled electrostatic charges over 25 mm. away.

Another suitable, but more expensive, method of producing this type of filament is to replace at least one nonconductive filament 44 (FIG. 3) with a continuous length of conductive material to help insure that filaments 42 have electrical connection with each other. In a variation of this, at least one filament 44 may be a continuous length of conductive material of one resistivity, such as carbon-coated plastic for example, with conductive strands 42 being a conductive material of another resistivity, such as hygroscopically conductive cellulose for example. In this embodiment the continuous conductive filament 44 provides the hygroscopically conductive cellulose with a lower relative resistance because the continuous conductive filament is electrically parallel with the hygroscopically conductive cellulose. Also for this, and other embodiments comprising a conductive material of continuous length, the continuous length may be completely covered by other material that is at least partially conductive and comprises concentrators, or placed beside or plied with other at least partially conductive material comprising concentrators. In addition, a mixture of lower resistivity material and higher resistivity material may be used for conductive strands 42. Although filament 44 and strands 42 are shown round, the invention is intended to also include flat or other shapes of nonconductive and conductive material.

Figure 4:
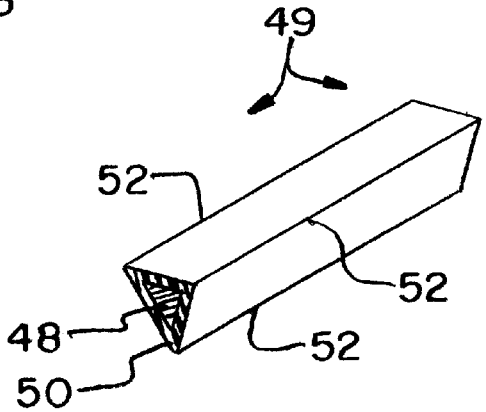
FIG. 4 is an enlarged, fragmentary, perspective view of a conductive filament comprising nonconductive material, conductive material, and field-concentrators, with portions thereof shown in section for clarity.
Figure 19:
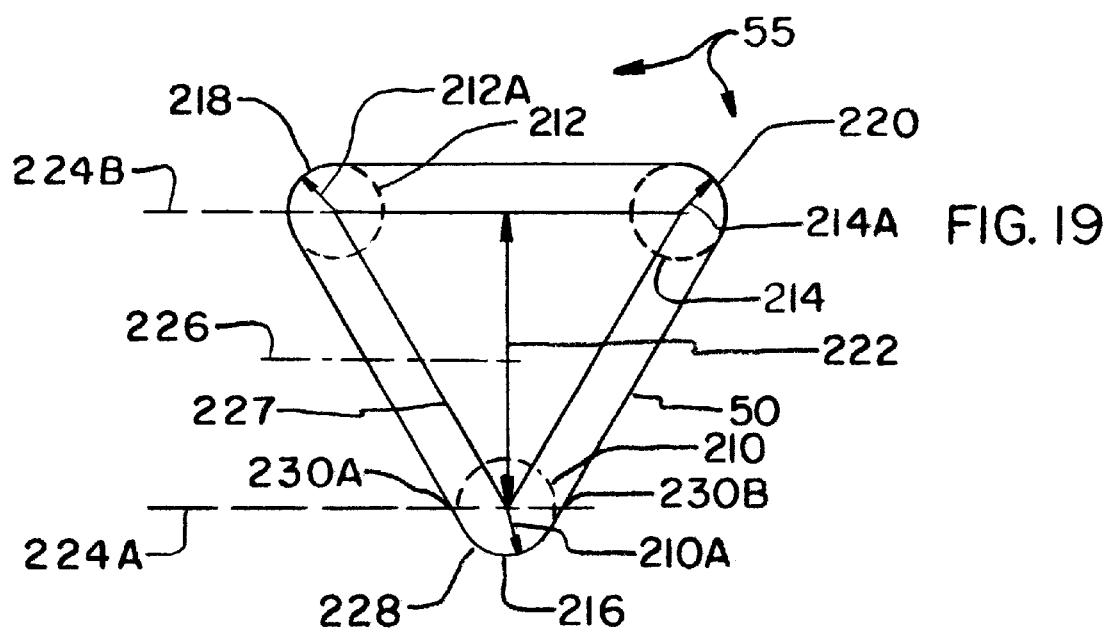
FIG. 19 is a fragmentary, diagrammatic view illustrating characteristics of a filament such as those shown in FIGS. 4–6.

FIG. 4 shows an alternative conductive filament 49 comprising concentrators suitable for use in undergarments. A core 48 of nonconductive material comprises a triangular cross section. Core 48 is coated with a conductive material 50, such as carbon black. The triangular cross section or shape results in ridges 52 arranged lengthwise at the edges of the filament that function as concentrators. Filament 49 may be used as short strands, or in continuous lengths, depending on the needs of a particular garment or various manufacturing considerations. Placing the field-concentrators 52 along the edges of the filament provides more concentrators per filament, and thus more opportunities for a concentrator to be optimally turned in the direction of any static charge in the area. Also, for this and other filaments comprising a conductive material of continuous length comprising concentrators, the continuous length may be completely covered by other material that is nonconductive or at least partially conductive and comprises concentrators, or placed beside or plied with other material that is nonconductive or at least partially conductive and comprises concentrators. FIG. 19 illustrates principles involved in the preferred design of filaments of this type.

Figure 5:
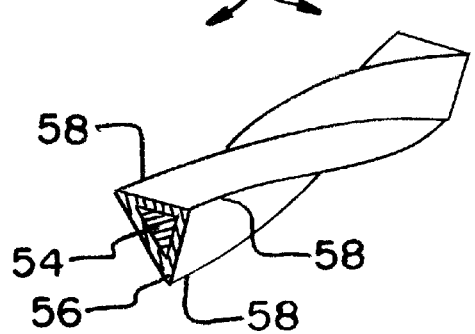
FIG. 5 is an enlarged, fragmentary, perspective view of an alternative filament comprising a nonconductive core coated with conductive material to form field-concentrators, with portions thereof shown in section for clarity.

FIG. 5 shows an alternative conductive filament 55 that is similar to filament 49 (FIG. 4). A core of nonconductive material 54 of triangular cross section is coated with a conductive material 56, with the shape forming longitudinal concentrators along ridges 58 along the length (edges) of the composite filament 55. The resulting "twisted" filament design enhances the ability of the concentrators to create air ions and cancel electrostatic charges by insuring that one of the concentrators is always directed toward the proper area. FIG. 19 illustrates principles involved in the preferred design of filaments of this type.

Figure 6:
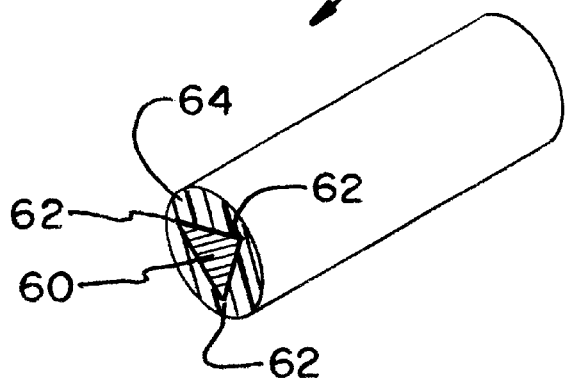
FIG. 6 is an enlarged, fragmentary, perspective view of an alternative filament incorporating conductive material with field-concentrators inside a nonconductive covering, with portions thereof shown in section for clarity.

Referencing FIG. 6, a generally cylindrical filament 59 comprises a conductive core 60 of generally triangular cross section, including longitudinal ridge concentrators 62. Core 60 is disposed within a nonconductive covering 64, and the composite filament 59 thus has a generally circular cross section Concentrators 62 run the length of the filament. Twistably rotating concentrators 62 around the axis of the filament as noted in FIG. 5 above is also desirable. Nonconductive material 64 protects conductive material 60 (FIG. 6) from damage. Also the structural strength provided by the generally triangular cross section of conductive material 60 helps avoid breakage of the conductive material, or separation of concentrators 62 from the other conductive bulk, when filament 59 is stretched during use.

This type of filament (i.e., FIG. 6) is not conductive along the outside surface, and the conductive material comprising concentrators will generally not make electrical connection with the wearer's body, or other similar filaments in the undergarment. The concentrators may therefore sometimes be slower to create air ions and cancel electrostatic charges, and are therefore not as preferred as the examples discussed having a conductive outer surface. FIG. 19 illustrates principles involved in the preferred design of filaments of this type. A variation of this construction is to allow one or more of the conductive concentrators 62 to extend through the surface of nonconductive material 64 to allow the filament to be conductive along its surface.

FIG. 7 shows a garment 65 generally in the form of pantyhose or tights. The alternate construction shown is suitable for any undergarment. Garment 65 comprises a top opening 66, a crotch portion 68, lower leg receiving openings 69 (shown by phantom lines) connecting to hose portions 70, and a body-encircling torso portion 72. The combination of body encircling portion 72 and crotch portion 68 are considered herein to be a torso portion of the undergarment. The entire garment (including the hose portions) could be constructed with filaments comprising electrostatic field-concentrators, or these may be placed in a pattern, such as a grid or parallel lines for example. Optionally, as a cost saving measure, conductive material comprising field-concentrators may be placed in only a portion of the garment, such as in the crotch area defined generally between dashed lines 78 (FIG. 7).

However, to reduce costs, it is preferred that at least a pattern of filaments comprising concentrators be deployed proximate the pelvic area. A stratum, in the form of liner 73 (FIG. 7) comprising conductive filaments and electrostatic field-concentrating points is placed inside the common nonconductive material of the pantyhose to cover at least a portion of the wearer's pelvic area. While liner 73 may be permanently attached to the pantyhose, it may be removable and/or replaceable. Liner 73 may comprise multiple plies. For example, an outer layer 74 is illustrated partially peeled down to expose inner layer 76 that comprises conductive material and field-concentrating points. Several types of material comprising electrostatic field-concentrating points are suitable for the liner. Candidate liner materials can be evaluated by considering desired design parameters, the production capabilities of the manufacturer, the targeted buyer, market costs, desired aesthetics, and the like.

A similar liner 79 (FIG. 8), suitable for use as liner 73 with garment 65 (FIG. 7), also comprises conductive strands providing field-concentrators. Numerous small, 3-denier acrylic strands 80 containing carbon black are adhered or otherwise attached on the surface of a nonwoven, flexible fabric base 82. Only a small area of conductive strands 80 are shown for clarity. Alternately, conductive strands 80 may be dispersed along with the material of flexible base 82 to provide concentrators. Examples of suitable materials for base 82 include woven, knitted and nonwoven fabrics, as well as various rubber or plastic foams. Conductive strands 80 are preferably incorporated in a length and quantity that insures that at least one strand end serving as a concentrator terminal surface is included in around every 6-mm or less of the surface area of material 82. It is preferred that the majority of strands 80 are in electrical connection with each other. Also, it is preferred that at least some of conductive strands 80 have a path of electrical connection to the wearer's body. A plurality of ends of the conductive strands extend outward away from the aggregation of conductive strand bodies and form concentrators to create air ions and cancel electrostatic charges in the vicinity. The flexible base 82 holds the conductive strands 80 in place, and it is soft and flexible to provide comfort for the wearer. FIG. 20 further details principles involved in the preferred design of concentrators of this type. Conductive strands 80 may also be applied to base 82 with other methods, such needle punch, or air entanglement, for example. In all methods, it is important to insure that a plurality of the strand 80 ends are distinctly oriented apart from the conductive mass, with the concentrator salient from the aggregation of conductive strands by a distance at least greater, and preferably 2 times or more greater, than the radius of the concentrator terminal surface. The completed stratum (liner) is cut into the appropriate dimensions and placed within a garment 65 (i.e., pantyhose).

An alternative, grid-like liner (FIG. 9) has been designated by the reference numeral 83. In this example, multiple, flexible polymer filaments 84 are patterned in an orthogonal matrix 85. Matrix 85 may be substituted for base 82 (FIG. 8) where desired. For example, matrix 85 may form a liner 73 or 79 discussed earlier. Separate concentrator bodies 86 are formed at spaced apart junctions within grid 83 at distances preferably 6-mm or less from one another. The polymer filaments are coated with conductive material if they are not intrinsically conductive. In use, the conductive liner is provided with one or more current paths establishing electrical contact with the wearer's body. Concentrator bodies 86 project upwardly from the surface plane of the grid, comprising terminal ends 88 that are elevated from the surface of the grid by a predetermined distance. FIG. 12 illustrates principles involved in the preferred design of liners of this type. In an alternate construction, instead of forming concentrators at junctions of the grid, the surface of the grid itself can be formed into concentrators by shaping the filaments 84 forming the grid similar to the structure shown in FIG. 2, with a field-concentrator ridge facing outwardly, away from the body of the wearer.

In each of the examples discussed herein it is preferred to electrically interconnect the conductive filaments or strands with at least a portion of the wearer's body. This allows the typical body surface, which emulates a 100 to 200 picofarad capacitor, to serve as an electron sink or source to help the field-concentrators maintain an optimum polarity and charge to create air ions. By way of example, the conductive filaments 90 (FIG. 10) comprising concentrators may be placed substantially on the outside of a nonconductive surface 92 of the undergarment. A conductive filament 94 may be extended through the nonconductive material, by sewing for example, to provide at least one point of electrical connection between conductive material 90 and the wearer's body. Alternative example methods for establishing electrical connection with the wearer's body include an opening in nonconductive material 92 to allow conductive filaments 90 to electrically connect with the wearer's body in at least one location, or allowing at least one of the filaments 90 to occasionally pass through nonconductive material 92 to touch the wearer's body. Also, contact can be made with the wearer's body by folding part of the conductive filaments 92 over at an edge of the garment.

Alternatively, a layer 96 of conductive material (FIG. 11) comprising suitable concentrators as previously described may be sandwiched between nonconductive layers 98 and 100. To establish at least one point of electrical connection with the wearer's body, a conductive filament 102 may be routed through layer 96 to touch the wearer's body. Alternative methods for establishing electrical connection with the wearer's body include those noted for FIG. 10.

FIG. 12 shows part of a grid and field-concentrator 86 of FIG. 9. The section cuts through the center of one of the concentrators and shows nonconductive polymer 87 coated with a layer of conductive material 89, such as doped polypyrole for example. The cross-sectional width of the concentrator at a point where the concentrator body rises from the conductive aggregation of the grid surface has been designated by the reference numeral 101 (FIG. 12). Concentrator body 86 starts at or rises from a reference point 91, and has a terminal surface 88 that is spaced at a distance 103 from the main plane of the bulk of the grid surface. Distance 103 is at least greater than, and preferably two times or more greater than, the axial radius of terminal surface 88. Terminal surface 88 is as small as possible commensurate with wearer comfort, with a diameter of around 0.5-mm or less preferred.

Garment 120 (FIG. 13) is in the form of a slip that incorporates filaments comprising electrostatic field-concentrators in the forms discussed herein. Shown is a top opening 122, a lower opening 123, and a torso portion 126 that covers at least part of the torso area and connects between the top opening and lower opening. Garment 120 may be dimensioned or styled differently, a half-slip being one example. To reduce costs, filaments 124 or 125 comprising field-concentrators are applied as a pattern, similarly to undergarment 21 (FIG. 1). Only small areas of filaments 124 and 125 are shown for clarity. Although the same pattern of filaments would commonly be used throughout the majority area of the slip garment 120, two pattern examples are show here. Filaments 124 on the left side 128 are arranged in a grid or matrix, but the filaments 125 on the right side 130 (FIG. 13) are disposed in parallel lines. If the spacing between adjacent filaments 125 is larger than about 5-mm, a grid pattern is more preferred because it provides more concentrators per unit area. A spacing of between around 1 to 10-mm is acceptable, with 6-mm or less spacing preferred. Also, in a preferred embodiment, the filaments 124, 125 are approximately the same diameter (or cross-sectional shape) as the nonconductive filaments included in the weave or knit of the fabric. Of course, the majority of the filaments 124 or 125, most particularly in the torso covering area, will preferably be electrically connected to the wearer's body.

Several types of filament comprising concentrators are suitable for use in a slip, and the type chosen will depend upon previously discussed factors.

Garment 131 (FIG. 14) comprises a T-shirt or undershirt embodiment, again equipped with filaments comprising electrostatic field-concentrators arranged within or upon the standard weave or knit of the fabric. Garment 131 comprises a top opening 132, arm openings 134 in sleeves 135, a torso opening 136, and a torso portion 138 that covers at least part of the torso area. Again, as a cost saving method, example filaments 137 or 139 comprising field-concentrators are applied in a pattern. Filaments 137 on the left side 140 are arranged in a grid, and filaments 139 on the right side 133 form parallel lines. Filament spacing discussed above are acceptable. Again, it is preferred that the majority of filaments and/or the majority of concentrators will have at least one electrical conduction path to the wearer's body.

An alternative filament 141 (FIG. 15) comprises an internal layer 142 of nonconductive material having at least one substantially flat surface. Layer 142 is provided with a thin external coating 143 formed of conductive material, such as carbon black. Its outer, rectangular side surface is labeled 143A, and its outer edge surface is labeled 144. The illustrated, parallelepiped geometry (FIG. 15) engenders elongated, ridge-like concentrator 145 along the boundary edges of filament 141 between surfaces 144 and 143A. With modified geometries, surfaces 143A and 144 may or may not intersect as sharply as drawn.

The resulting filament 141 may be used in a relatively straight condition, or in a preferred embodiment it is twisted so the concentrators rotate around the filament. Filament 141 may also be twisted or plied with other filaments or strands if desirable. The filament may be used as short strands, or in continuous lengths, depending on the needs of a particular undergarment or manufacturing need. Placing the field-concentrators along the edges of the filament provides more concentrators per filament, and thus more opportunities for a concentrator to be optimally turned in the direction of any static charge in the area.

Figure 17:
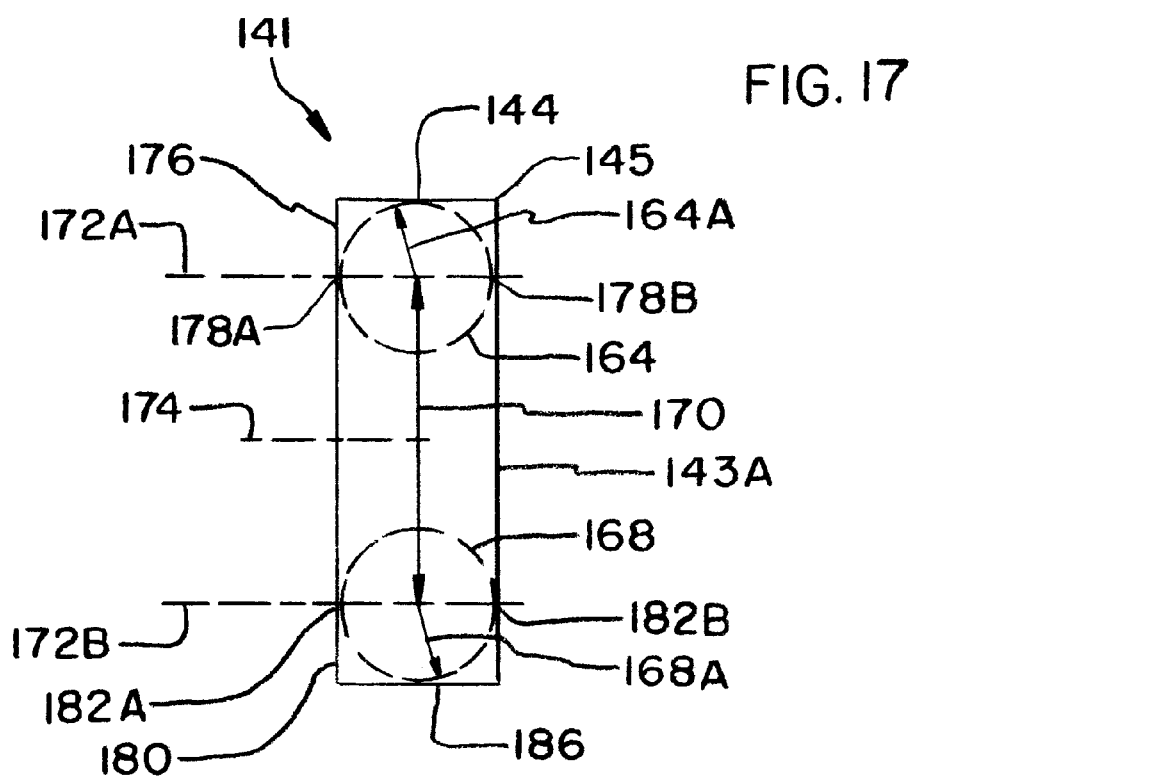
FIG. 17 is a fragmentary, diagrammatic view illustrating characteristics of a filament such as that shown in FIG. 15.

One method for producing filament 141 is to coat at least one side of a thin plastic film with conductive material. The resulting film is then cut into the desired width and twisted (and heat set if needed) so the edges that form the field-concentrators revolve like a helix around the filament body. In this alternate embodiment the edges of the slit film are not coated with conductive material, but the edges of the coated surface form good concentrators. FIG. 17 illustrates principles involved in the preferred design of filaments of this type.

Figure 18:
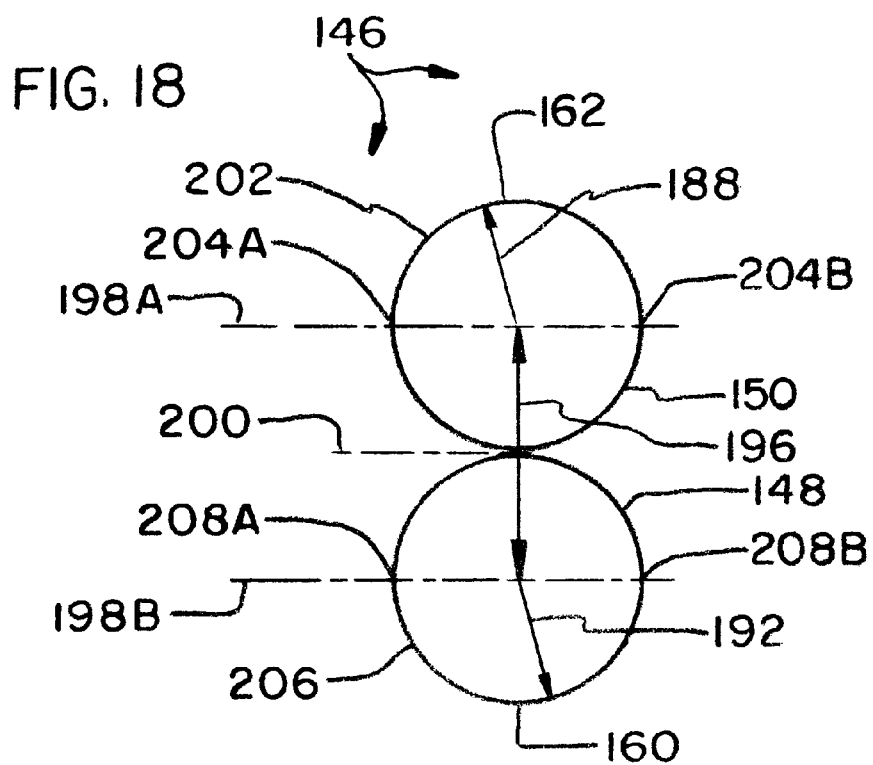
FIG. 18 is a fragmentary, diagrammatic view illustrating characteristics of a filament such as that shown in FIG. 16.

Referring to FIG. 16, conductive filament 146 comprises concentrators suitable for use in undergarments, like those previously shown in FIGS. 1, 2, 7, 13, and 14 for example. In this example at least two smaller filaments 148, 150 with nonconductive cores 152, 154 respectively are twisted together. The filaments 148, 150 are coated with conductive material, such as carbon black for example, to form outer, coaxial sheathes 156, 158 respectively. The twisted configuration of filament 146 creates field-concentrators 160 and 162 that in effect rise (saliently) and fall at locations along the opposing edges of the larger twisted filament body. The filament may be used as short strands, or in continuous lengths, depending on the needs of a particular garment or manufacturing need. Placing the field-concentrators along the edges of the filament provides more concentrators per filament, and thus more opportunities for a concentrator to be optimally turned in the direction of any static charge in the area. The larger twisted filament may be formed from smaller filaments of the same size, or from filaments of different size. In this regard it is preferred that at least one of the smaller filaments be around 75 denier or less, and more preferred that at least one of the smaller filaments be around 50 denier or less. The smaller filaments may also be of different types, such a filament with a continuous concentrator along at least one edge twisted with a filament having periodic concentrator locations along its length for example. Also the smaller filaments may be of the same or different resistance. In this regard it is preferred that at least one of the smaller filaments have an electrical resistivity of around $10^{10}$ ohms/cm or less (50% relative humidity), but more preferred that at least one of the smaller filaments have a resistivity of around 106 ohms/cm or less. FIG. 18 illustrates principles involved in the preferred design of filaments of this type.

Although they are of different shape, the filaments of FIGS. 4–6, and 15–16, are in the same operational class, with the same operational characteristics. They have one or more electrically conductive field-concentrators running lengthwise along the filament. The concentrator bodies occur in locations at one or more of the smallest axial cross-sectional areas of the filament, and comprise ends, edges, sides, ridges, and the like. At least one concentrator comprises a concentrator body (intended to include an edge, side or relatively flat surface such as an end) that can be defined by a radius. It is preferred that the radius is around 0.2 mm or less, with around 0.1 mm or less more preferred. A concentrator body starts on the conductive surface of the filament at points transverse from the center of the radius of the concentrator body. The outermost area of at least one concentrator body is a terminal surface that is salient from the central bulk of the filament by a distance at least as great as the radius of the concentrator body. In the most preferred method, the outermost area of the terminal surface of at least one concentrator body for a particular filament is salient from the center of the central bulk of the conductive material of the filament by a distance at least greater than, and preferably two times or more greater than, the radius of the concentrator terminal surface.

FIG. 17 diagrammatically illustrates principles associated with the filament shown in FIG. 15. Only the outermost boundaries of the filament 141 are shown. The boundaries between the nonconductive layer 142 and the outer conductive coating 143 (FIG. 15) have been omitted from FIG. 17 for clarity. Imaginary circles 164 and 168 are drawn within the filament mass, between opposing outer surfaces, at the extremities of the structure. Circles 164 and 168 define the radius of the concentrator bodies. The radius of circle 164 is indicated by numeral 164A, with the radius of circle 168 indicated by numeral 168A. One portion of the filament 141 that functions as a concentrator is confined generally within the area swept by radius 164A, between the center of the circle 164 and surface 144; this area extends from reference points 178A to 178B and is designated by reference numeral 176. The lower portion of the filament 141 that functions as a concentrator is confined generally within the area swept by radius 168A, between the center of the circle 168 and the lower surface 186; this area extends from reference points 182A to 182B and is designated by reference numeral 180 (FIG. 17). As used herein, the term "central bulk" of the filament 141 refers to that central mass of filament material not comprising a concentrator. If the filament does not include more than one concentrator, the central bulk would start where the concentrator starts, and end at the adjacent outer conductive surface most distant from the concentrator.

The central bulk is defined between lines 172A and 172B, each of which transversely penetrate a center of circle 164 or 168 respectively. The length of this central bulk is shown by line 170, and the center of the central bulk is located at the intersection of lines 170 and 174.

Thus, the length 170 of the central bulk of the filament is at least greater than the radius (i.e., 164A or 168A) of a given concentrator circle. Preferably the length 170 is two times or more bigger than the concentrator circle radius.

Also it is preferred that at least one concentrator terminal surface 144 or 186 is salient from the center of the central bulk of the filament by a distance at least greater than the radius of a given concentrator circle. Most preferably the latter distance is at least two or three times the radius of a given concentrator circle. This optimal construction causes impinging electrostatic fields to preferentially connect to the terminal surfaces. As explained later in more detail, this forces the fields to crowd close together on the concentrators and intensity enough to create air ions that intercept the impinging fields and also move to cancel the charges creating the fields.

FIG. 18 diagrammatically illustrates principles associated with the filament 146 shown in FIG. 16. The outermost boundaries of filament 146 (FIG. 16) are shown in FIG. 18. The cross-sectional shape of the two smaller conductive filaments 148, 150 forms concentrator bodies and terminal surfaces along opposing edges of the structure at 162, 160. In this example the concentrator circles are coincident with the individual filaments; numerals 188 and 192 respectively indicate the radii of the concentrator circles. The concentrator circles are drawn within the filament mass, at the extremities of the structure. One portion of the filament 146 that functions as a concentrator is confined generally within the area swept by radius 188, above the strand/circle center intersected by line 198A; this area extends from reference points 204A to 204B and is designated by reference numeral 202. The lower portion of the filament 146 that functions as a concentrator (i.e., 206) is confined generally within the area swept by radius 192, below the strand/circle center intersected by line 198B, as indicated between reference points 208A and 208B. The central bulk of the filament 146 (i.e., that mass of filament material not comprising a concentrator) is defined between lines 198A and 198B, each of which transversely penetrates a circle center. The length of this central bulk is shown by line 196, and the center of the central bulk is located at the intersection of lines 196 and 200.

Thus, the length 196 of the central bulk of the filament 146 (FIG. 18) is at least greater than the radius (i.e., 188 or 192) of a given concentrator circle. When similarly-sized strands touch each other as in FIG. 18, the length 196 is two times bigger than the concentrator circle radius.

Also it is preferred that at least one concentrator terminal surface 162 or 160 is salient from the center of the central bulk of the filament by a distance at least greater than the radius of a given concentrator circle. Most preferably the latter distance is at least two or three times the radius of a given concentrator circle.

FIG. 19 diagrammatically illustrates principles associated with the filaments 49 and/or 55 shown in FIGS. 4 and 5 respectively, to the conductive core 60 of FIG. 6, and to other regular or irregularly shaped constructions not illustrated. The outermost periphery of a filament 55 (FIG. 4) is shown, but other shapes are applicable as well. Imaginary circles 210, 212, and 214 (FIG. 19) are inscribed within the generally triangular mass at the vertices of the triangle; the outermost edges of the latter regions form the concentrators 216, 218, 220. The radiuses of the circles are indicated by numerals 210A, 212A, and 214A respectively, and these radiuses reach the terminal surfaces 216, 218, and 220. An "inner triangle" 227 whose vertices align with the centers of circles 210, 212 and 214 defines the central bulk of the filament 55. The central bulk of a filament of vastly different construction is identified in the same manner. Reference line 222 corresponds to the altitude of inner triangle 227, with reference line 226 indicating the center of the altitude. The concentrator bodies start on the conductive surface at points transverse from the center of the radius of the concentrators, with these points 230A and 230B shown for only one concentrator body 228. Thus, as in FIGS. 17 and 18, at least one concentrator terminal surface is salient from the central bulk of the filament by a distance at least equal to the radius of the terminal surface. Preferably, at least one concentrator terminal surface is also salient from the center of the central bulk of the filament by a distance at least greater than, and optimally 2 times or more greater than, the radius of the terminal surface.

FIG. 20 diagrammatically illustrates dimensions preferred with designs similar to preferred filament 41 (FIG. 3.) FIG. 20 is a cross-sectional view of a fragment of filament 41, with a plurality of concentrator terminal surfaces 46 salient from the immediate longitudinal aggregation of other conductive bodies. In other words, surfaces 46 project outwardly away from the longitudinal body of the composite filament. This "salience" is greater than, and preferably two times or more greater than, the approximate axial radius of the concentrator terminal surface. In FIG. 20, another imaginary circle 232 perpendicular to the axis of the filament of FIG. 3 completely encircles the conductive strands 42 of filament 41, penetrating strands 44 and touching the outer boundaries of the longitudinal aggregation of strands 42. This can be thought of as a segment of the filament along its length with a typical, generally cylindrical cross section of minimal diameter; between these minimal diameter segments there will be "salient" conductive field-concentrators projecting outward at angles to the longitudinal axis of the composite filament. For clarification, imaginary circle 232 circumscribes and defines the central bulk of filament 41 at its location, and does not encompass a concentrator terminal surface at this location. The circle is drawn at a minimal-diameter location, just ahead of a concentrator that saliently extends away from filament body, which is viewed "head on" in FIG. 20. This concentrator surface 46A is "salient" from the immediate aggregation of conductive strands 42. The terminal surface 46A of concentrator body 43 extends from the central bulk (i.e., circle 232) by a distance greater than the approximate axial radius of the concentrator terminal surface 46A. In other words, terminal surface 46A extends outwardly from the central bulk of the filament by a distance at least as great as one-half of its axial width. Reference circle 234, with radius 236, indicates the axial radius of the concentrator terminal surface. Preferably the terminal surface extends outwardly from the central bulk a distance two times or more greater than the axial radius of surface 46A.

This preferred method maximizes the ability of the concentrators to attract impinging electrostatic fields from even low-level nearby electrostatic charges and create air ions that then move to combine with and cancel electrostatic charges generating the electrostatic fields.

In Vivo Studies

Before further discussing methods and materials, it will be helpful to note the results of examples of the inventor's studies with animals exposed to electrostatic fields, and to electrostatic fields and chemicals in combination. The total scope of the inventor's studies regarding electrostatic field influence inside a living body has involved over 350 tumor-bearing rodents, however for the sake of brevity only four such studies will be noted here. The inventor's research protocol used the B6C3F1 mouse strain. This mouse is recognized by the National Cancer Institute as one Standard for chemotherapy research, and is one of the commonly accepted rodent species used in cancer studies. For the inventor's studies, female mice were implanted with murine mammary 16/C adenocarcinoma, a commonly used tumor for cancer research. The 16/C murine mammary tumor is particularly aggressive, and can normally grow from a barely visible, or even invisible, bump under the skin the day after the implant, to 10 to 20 percent of the animal's total body weight by day 14 (tumor size typically up to 4 grams). Approximately equal-sized tumor fragments were implanted in each mouse's axillary region through a puncture in the inguinal region. All test animals were approximately six weeks old, with a body weight of 17 to 20 grams at the time of implant. Also, food and water were provided ad libitum throughout each study, and all Groups were exposed to the same temperature and light conditions (lights on 12 hours and off 12 hours each day). The studies were blinded in both the assignment of the animals to the study groups, and in all tumor measurements.

The first two studies discussed here demonstrate the ability of electrostatic fields to strongly increase the affect of chemical agents inside a mammalian body. After the tumors were allowed to establish and grow for several days, the mice were treated with adriamycin (ADM), a commonly used chemotherapeutic agent, at dose levels based on their individual weight and known to be safe. Following this, the animals were blindly divided into the study groups. The growth rate of the tumors in a Control Group, without exposure to electrostatic fields, was compared to that of Test Groups that were under the influence of an electrostatic field. Tumor measurements were made by caliper using the prolate ellipsoid formula of the National Cancer Institute to convert the measurements into weight. This method allowed the tumor weight of each animal to be tracked throughout the study.

The mice in each Test-Group were subjected to electrostatic fields with the use of special cages. When the application of electrostatic fields was required, special equipment was used to expose the desired animal groups to an electrostatic field with an intensity of approximately 79,000 V/m from a charged element insulated from the animals.

EXAMPLE A

In the first study noted here, four groups of eleven tumor bearing animals each were used. There was not a statistical difference in the size of the animal tumors at the start of the study. All of the animals were treated with 12 mg/kg ADM on day 4, and housed in cages containing an insulated metal screen suspended 25.4-mm above the animals.

GA: Control, treated with ADM and no electrostatic field exposure. The screen above animals was not charged.

GB: The screen was charged, and changed from positive to negative 15kV DC once each 15 minutes. This group also had a grounded wire grid below (outside) the cage (90 mm between screen and grid).

GC: The screen was charged 15kV DC, and changed from positive to negative once each 15 minutes. The animals were on a grounded wire grid cage floor (15 mm between the screen and floor).

GD: The screen was charged, and changed from positive to negative 15kV once each 15 minutes. There was no ground plane nearby.

Tumor regression caused by the ADM, and the combination of ADM and electrostatic fields is shown below:

GA: −24% tumor wt. loss.

GB: −86% tumor wt. loss.

GC: −80% tumor wt. loss.

GD: −75% tumor wt. loss.

In this study, all of the electrostatic field treated groups achieved significantly higher tumor cell kill than the group treated with ADM only. At three different times during the study, a Leeds and Northrup 0.1 microampere sensitivity meter was used to measure any current flow to ground in the cages. No current flow was detected for any of the groups, confirming that the effects observed were caused solely by exposure to the electrostatic fields. Statically Statistically, the study demonstrated p-values as low as 0.001, and odds as high as 8.3 to 1, that an animal in Groups B, C, or D (with field exposure) would have less tumor growth than an animal in Group A (without field exposure).

The findings of this study have hopeful implications, because it may be possible to use electrostatic fields to beneficially increase the affect of chemotherapy in cancer patients, and the inventor is pursuing that possibility. However the findings also have sinister implications. Any external electric field capable of significant influence inside a mammalian body can present a danger. This is demonstrated in the following three studies.

EXAMPLE B

This study used three groups of 11 tumor-bearing animals each. There was not a statistical difference in the size of the animal tumors at the start of the study. All of the animals were treated twice with 8 mg/kg ADM given on days 3 and 5 (16 mg/kg total). In addition, Groups B&C were exposed to an electrostatic field for 4 hours following each injection.

GA: Control, treated with ADM and no electrostatic field exposure.

GB: ADM plus exposure to a negative 15kV DC charged screen 25.4 mm above, with a grounded grid below, the animals (90 mm between screen and grid).

GC: ADM plus exposure to 15 minute cycles of positive then negative 15 kV DC on a screen 25.4 mm above, with a grounded grid below, the animals (90 mm between screen and grid).

In this study the inventor inadvertently allowed the applied electrostatic fields in Groups B and C to increase the affect of the ADM to a lethal level. All of the animals in this study were treated with the same ADM dose at a level known to be safe, and the animals in GA, without exposure to a static field, incurred no ill affect until day 30 when the affect of the tumor (not the ADM) killed the first animal. The electrostatic fields that Groups B and C were exposed to increased the reaction of body cells to the ADM, creating the effect of a lethal overdose. Necropsy revealed obvious heart enlargement of the dead animals in these groups, which is the classic symptom of ADM overdose (irreversible myocardial toxicity with delayed congestive heart failure).

TABLE 1

| Day | Group A | Group B | Group C |
| --- | --- | --- | --- |
| 0 Implant all tumors | | | |
| 1 | | | |
| 2 | | | |
| 3 First treatment | | | |
| 4 | | | |
| 5 Second Treatment | | | |
| 6 | | | |
| 7 | | | |
| 8 | | | |
| 9 | | | |
| 10 | | | |
| 11 | | | X |
| 12 | | XXX | XXXXX |
| 13 | | | |
| 14 | | | |
| 15 | | | |
| 16 | | | |
| 17 | | | |
| 18 | | X | |
| 19 | | X | |
| 20 | | | |
| 21 | | | |
| 22 | | X | |
| 23 | | | |
| 24 | | | |
| 25 | | | |
| 26 | | | |
| 27 | | | |
| 28 | | X | |
| 29 | | | |
| 30 | X | | |

ADM is a non-polar molecule, so the applied fields in this study were not directly affecting the chemical, instead the fields were increasing the reaction of the animals' bodies to the chemical. This study demonstrates that externally applied electrostatic fields can react very powerfully with body cells, increasing the response of the body to chemicals. The increased response can be strong enough that a normally well-olerated chemical dose becomes lethal. This has important implications in regard to the ability of electrostatic fields to increase the detrimental affect of environmentally encountered chemicals on cells. In the next two studies discussed here, the inventor exposed tumor-bearing mice to electrostatic fields without treating the mice with ADM.

EXAMPLE C

Two groups of 6 tumor-bearing animals each were used in this study. There was not a statistical difference in the size of the animal tumors at the start of the study. None of the animals were treated with ADM . One of the groups was not exposed to an electrostatic field. The other group was exposed to an electrostatic field from day 2 to 16.

GA: Control, with no field exposure.

GB: Exposed to the field from a 15 kV (negative) charged plate under the cage.

Both group s of animals started the study with approximately the same size tumors, yet by day 16 the tumors in the electrostatic field exposed group were signifi cantly larger than those in the group not exposed to the field:

GA: Median tumor wt. 0.9 g, day 16.

GB: Median tumor wt. 3.2 g, day 16

The group exposed to electrostatic fields experienced an accelerated cancer growth rate over 3.5 times that of the group not exposed to the field. Thus, external electrostatic fields can promote cancer growth inside a mammalian body.

EXAMPLE D

Four groups of 11 tumor-bearing animals each were used in this study, and none of the animals were treated with chemotherapy. There was not a statistical difference in the size of the animal tumors at the start of the study. Groups C and D were exposed to electrostatic fields from static charges generated on the animals' fur as the animals rubbed against a layer of polyester carpet suspended in the cages above the animals. Group B also had the same type of carpet suspended in the cage, but it was treated to generate only low level electrostatic fields. Charges on the animals' fur in each group were measured and averaged daily.

GA: Low charge generation cage with no carpet suspended above the animals. An average of 60 volts charge was found on the animals' fur during the study.

GB: Carpet suspended above the animals, but the carpet was treated to allow only low-level charge generation. An average of 300 volts electrostatic charge was found on the animals' fur during the study.

GC: Standard carpet suspended above the animals. An average of 1,250 volts electrostatic charge was found on the animals' fur during the study.

GD: Standard carpet suspended above the animals. An average of 2,350 volts charge was found on the animals' fur during the study.

All of the animals started the study with approximately the same size tumors. The study was ended on day 13, and by this time the two groups (C and D) which were exposed to strong electrostatic fields had significantly larger tumor growth than the two groups (A and B) which were exposed to only low level electrostatic fields:

GA: 1,642% median tumor wt. gain.
GB: 1,467% median tumor wt. gain.
GC: 3,459% median tumor wt. gain.
GD: 3,407% median tumor wt. gain.

P-values for Groups C and D, compared to Groups A and B, ranged from 0.01 to 0.007 on the various measurement days. Odds were over 2.5 to 1 that an animal from Groups C or D would have greater tumor growth than an animal from Groups A or B.

The naturally generated electrostatic charges and fields used in this study are identical to those generated as our clothes rub together or against other surfaces, and were well within the range of common charges found on our clothes and other surfaces we rub against (chairs, etc.). This points to the danger we can face each day from these fields. The inventor's animal studies have shown that these fields can detrimentally increase body cell reaction with chemicals, and can also promote cancer growth. With this strong level of influence, there is reason to believe that these fields may also be able to initiate cancer, either directly or by increasing the affect of environmentally encountered chemicals. Summarizing the above study examples, it is clear that:

1. Contrary to common assumptions, exposure to electrostatic fields can exert strong influence inside a mammalian body.
2. Exposure to electrostatic fields can change normal cell operation.
3. Exposure to electrostatic fields promotes cancer growth.
4. Exposure to electrostatic fields makes cells more susceptible to reaction with chemicals inside the body.
5. Protecting particularly sensitive body areas, such as the torso area for example, from exposure to electrostatic fields is important.

METHOD AND MATERIAL EXAMPLE

The inventor's research indicates that environmentally created, electrostatic charges are present on surfaces around us more often than not, and that fields from these charges can strongly, and detrimentally, influence cells inside a living body. Cells in the torso area are highly susceptible to cancer. Thus the protection of torso area tissue from detrimental electrostatic fields is very important. The electrostatic fields that most endanger torso area tissue result from electrostatic charges in locations proximate the torso. For example, fields may emanate from charges directly on an undergarment surface, or from the surface of an outer garment, such as a shirt. Undergarments under the invention minimize electrostatic field influence on torso area tissue by providing a conductive material comprising a plurality of electrically conductive field-concentrators at spaced apart locations that respond to an impinging electrostatic field by creating ions.

Machinery for producing appropriate filaments according to the invention is used to orient the concentrators and dimension them to be salient from the central bulk of the electrically conductive material. Methods such as napping, brushing, blowing, or vacuuming the yarn, filament, or fabric for an undergarment may also be incorporated. Filaments under the invention may also be subjected to other treatments and methods known in the industry, such as for example crimping, dyeing, bleaching, and plying or twisting together or with other materials. Without having to resort to grounding, as is common in some industries, undergarments in the present invention can attenuate electrostatic fields at their source even if the source is not directly on the material of the undergarment, but is instead on another surface such as a shirt, or pants, or a chair set for example. This helps protect tissue covered by the structure of the undergarment, and adjacent tissue that is not covered, from detrimental fields. This is important because many popular undergarment designs do not cover all of the torso area tissue.

In operation, electrostatic fields in the vicinity of the torso area of the undergarment wearer are attracted to connect to the conductive material comprising concentrators. This induces charges in the conductive material, and charges having the same polarity as the electrostatic field are repelled through the conductive material away from the field source while charges having a polarity opposite that of the field are attracted toward the field source. Some of the charges attracted toward the field source crowd together at the relatively small area presented by the concentrators, and this creates an intense electrical charge at the concentrators. This intense electrical charge then attracts some of the impinging electrostatic fields to crowd together and preferentially connect to the concentrators. This concentrates the electrostatic field at the concentrators, locally intensifying the field strength. The intensified field in turn accelerates normal movement of free electrons and ions near the concentrators. Accelerated movement causes the electrons and ions to crash into adjacent molecules and dislodge additional electrons and ions, in a chain reaction. Thus, in typically a fraction of a second, a cascading action occurs which results in many free electrons and ions in the air around the concentrators. The charges carried by these free electrons and ions are in turn influenced by the electrostatic field.

Charges in the air having the same polarity as the source of the electrostatic field are attracted to the concentrators. If the charges stay on the concentrators this can reduce the ability of the concentrators to attract and intensify the electrostatic field, and this is not desirable. One method to avoid this is to have the conductive material carrying the concentrators provide a large enough surface that undesirable charges can flow off the concentrators and be contained on that surface. Another, and generally more preferable, method to avoid this is to arrange for the majority of at least the torso area of undergarment conductive material carrying the concentrators to have at least one path of electrically conductive connection with the body of the undergarment wearer. This allows undesirable charges (having the same polarity as the electrostatic field) to be forced from the conductive material comprising concentrators to the wearer's body (where they either drain off or spread over the body to have no effect) so they are prevented from reducing the charge carried by the concentrators.

Charges in the air having a polarity opposite that of the source of the electrostatic field are attracted to move toward the source of the field, where they intercept and attenuate the field and combine with and cancel charges that are generating the field to minimize the influence of the electrostatic field on the undergarment wearer.

The term "concentrators" as used herein is intended to include conductive edges, sides, ridges, projections, ends, and the like, and also irregularly shaped conductive surfaces, that can concentrate electrostatic field force enough to create air ions in the presence of strong electrostatic fields. As a cost saving method, the concentrators will preferably be spaced to occur at least around each 10-mm or less of surface area in at least a portion of the undergarment covering a portion of the wearer's torso area. However, an average spacing of one or more concentrators around each 6 square mm or less, of at least part of the torso covering portions of the undergarment, is more preferred because it is desirable to provide a high concentration of concentrators to intercept more electrostatic fields and help generate a large number of air ions close to the field source. It is also desirable that the concentrator body, or at least the concentrator terminal surface, have as small a cross-sectional width as possible under the design of a specific desired undergarment.

The term "conductive" as used herein is intended to mean an ability to quickly move charge carriers, such as electrons or ions for example, to or away from the field-concentrators in response to an impinging electrostatic field. The material forming the conductive material and the field-concentrators may be any electrically conductive material, or may be an electrically conductive material applied to the surface of, and/or incorporated within, relatively nonconductive material or materials. As a cost saving method, it is often desirable to apply only a small amount of conductive material to a portion of nonconductive materials used in undergarments under the invention, and examples of methods of achieving this include coating, suffusing, or mixing the conductive material with nonconductive material or materials. The conductive material may also be carried by another material, with titanium dioxide being one example, applied to or mixed with nonconductive material.

Examples of suitable conductive materials include metals, conductive metal oxides, conductive carbon black, conductive chemicals and chemical compounds, conductive polymers, hygroscopic materials, and mixtures thereof. However high resistivity slows down the ability of charges to move in the conductive material and accumulate at the concentrators, so conductive materials, or combinations of conductive materials providing an effective resistivity around 10 ohm or less from the axial plane of the electrically connected material to the end of an adjacent concentrator terminal surface, at 50% relative humidity, are preferred, and conductive materials with around 106 ohm/centimeter or less resistivity are more preferred. Sterling Fibers, Pace, Fla., can supply suitable 3 denier acrylic strands about 37-mm long that contain conductive carbon black.

The conductive material chosen for a particular undergarment design will often depend upon economic factors, such as aesthetics, material cost, or equipment available at a given undergarment manufacturer for example. The conductive material comprising concentrators may be placed on any surface of, or within, the structure of the undergarment, or may comprise the undergarment itself Also, the conductive material comprising concentrators may be incorporated in or on only some portion of the undergarment, such as for example parallel lines or a grid, or other patterns, to reduce cost, or may present a relatively unbroken surface for example when the conductive material comprising concentrators is used to produce an entire undergarment. It is most typical for the conductive material comprising concentrators to be applied as the yarn or filament used to produce the fabric from which an undergarment is made. However, it is also suitable under the invention to apply the conductive material to form concentrators on or in a fabric or other material (yarn, filament, etc.) that will be used for an undergarment after the fabric or other material is partly, or completely, made. Examples of methods of doing this include baths, spraying, and the like.

Undergarments under the invention may or may not be electrically conductive across their surface, but will provide a constituent of conductive material comprising concentrators that are capable of transporting electrons (or ions) in response to an impinging electrostatic field. In a preferred embodiment, the plane of material comprising concentrators will cover at least a portion of the torso area of the wearer, but may also be beneficially included in other areas, such as hose portions for example. The undergarments may also be specialty items, such as bodysuits, teddies, and the like, for example. Also in a preferred embodiment the concentrators have at least one path of electrically conductive connection with the body of the undergarment wearer. In addition, it is preferred that seams in the undergarments are constructed to provide electrical continuity for at least some of the filaments comprising field-concentrators.

Filaments comprising concentrators under the invention may be completely constructed with conductive materials, for example conductive filaments twisted with conductive strands forming concentrators, or conductive strands twisted together and forming concentrators. However, cost and comfort will generally dictate the use of nonconductive material and conductive material in various combinations in undergarments under the invention. The term "nonconductive material" in this context is intended to mean any material, strand, filament, fabric, etc., which is not electrically conductive in the invention, and can be used to form an undergarment, or part of an undergarment.

The terms "filament", "strand" and "yam" as used herein are not intended to be limiting in any way, and it is not intended that the use of one term should exclude the others.

Although the description above contains many specificity's, these should not be construed as limiting the scope of the invention but as merely providing illustrations of some of the presently preferred embodiments of this invention. For example, panties, underpants, and pantyhose under the invention may be of any design, for example brief or full pelvic area coverage. In another example, undergarments under the invention may be unisex in design as well as gender specific.

Also, other equivalents of the materials and methods shown may be used. Thus the scope of the invention should be determined by the appended claims and their legal equivalents, rather than the examples given.

What is claimed is:

1. An undergarment adapted to be worn by a user that covers at least a portion of his or her body, the undergarment comprising:
   a torso portion comprising at least one layer of a material and covering at least a part of a body torso area;
   at least part of said torso portion comprising an electrically conductive portion;
   at least part of said electrically conductive portion comprising a plurality of spaced-apart electrostatic field-concentrators comprising a terminal surface upon which electrostatic fields concentrate thereby creating ions for canceling electrostatic charges; and,
   whereby the undergarment protects at least part of a body torso area of the wearer from detrimental influence from electrostatic fields.

2. The undergarment of claim 1 wherein at least a part of the electrically conductive portion comprises a central bulk and a plurality of said electrostatic-field concentrators comprise a terminal surface having an axial width, and wherein a plurality of said terminal surfaces project saliently from the central bulk of said electrically conductive portion by a distance at least as great as one-half of the terminal surface axial width.

3. The undergarment of claim 1 wherein at least a part of the conductive portion comprises a filament, said filament comprising conductive strands, with portions of the conductive strands forming at least some of said electrostatic field-concentrators along the length of the filament.

4. The undergarment of claim 1 wherein at least a part of the conductive portion comprises filaments having a central bulk and providing electrostatic field-concentrators.

5. The undergarment of claim 4 wherein a plurality of said electrostatic-field concentrators comprise a terminal surface, and wherein at least one terminal surface projects saliently from the central bulk of the filament.

6. The undergarment of claim 4 wherein a plurality of said electrostatic-field concentrators comprise a concentrator body and a terminal surface that can be defined by a radius of a circle drawn within the concentrator body, and wherein at least one terminal surface projects saliently from the central bulk of a filament by a distance at least as great as that radius.

7. The undergarment of claim 6 wherein the filament comprises a body with a generally rectangular cross section with conductive portions forming at least one electrostatic field-concentrator.

8. The undergarment of claim 6 wherein the filament comprises a body with a generally triangular cross section with conductive portions forming at least one electrostatic field-concentrator.

9. The undergarment of claim 6 wherein the filament comprises a core with a generally triangular cross section with conductive portions forming at least one electrostatic field-concentrator.

10. The undergarment of claim 6 wherein the filament comprises a body with a generally circular cross section with conductive portions forming at least one electrostatic field-concentrator.

11. The undergarment of claim 1 wherein at least part of the conductive portion comprises a conductive filament and conductive strands, with portions forming at least some of said electrostatic field-concentrators along the length of the filament.

12. The undergarment of claim 1 wherein at least a part of the conductive portion comprises a liner having electrostatic field-concentrators.

13. The undergarment of claim 1, wherein at least a part of said electrically conductive portion is dispersed within a nonconductive material.

14. The undergarment of claim 1, wherein said electrically conductive portion comprising a plurality of spaced-apart electrostatic field-concentrators is used to construct the majority of the undergarment.

15. The undergarment of claim 1, wherein at least a part of said electrically conductive portion is incorporated as a pattern along with a nonconductive material.

16. The undergarment of claim 1, wherein at least a portion of said electrically conductive portion makes electrical connection with the body of the user.

17. The undergarment of claim 1 further comprising means for establishing at least one path of electrical connection between at least part of said electrically conductive portion and the body of the user.

18. The undergarment of claim 1, wherein at least part of said electrically conductive portion is not in electrical connection with the body of the user.

19. The undergarment of claim 1, wherein the undergarment is selected from the group consisting of panties, underpants, undershorts, pantyhose, slip, T-shirt, and undershirt.

20. An undergarment adapted to be worn by a user that covers at least a portion of his or her body, the undergarment comprising:
   an electrically conductive portion;
   at least part of said electrically conductive portion comprising a plurality of spaced-apart, electrostatic field-concentrators upon which at least some electrostatic fields impinging upon the undergarment concentrate thereby creating ions for canceling electrostatic charges, and,
   whereby the undergarment protects at least a portion of a body area of the user from electrostatic fields.

21. The undergarment of claim 20 wherein at least part of the conductive portion comprises a filament having a central bulk, the filament comprising electrostatic field-concentrators that project saliently from the central bulk.

22. The undergarment of claim 21, further comprising means for making electrical connection between said filament and the user.

23. The undergarment of claim 21 wherein a plurality of said electrostatic-field concentrators comprise a concentrator body and a terminal surface that can be defined by a radius of a circle drawn within the concentrator body, and wherein at least one terminal surface projects saliently from at least part of the central bulk by a distance at least as great as that radius.

24. The undergarment of claim 20 wherein at least part of the conductive portion is formed as a liner adapted to be attached to the undergarment.

25. The undergarment of claim 24 wherein a plurality of said electrostatic field-concentrators comprise a terminal surface that projects saliently away from the liner.

26. The undergarment of claim 21 wherein the filament comprises one or more strands with generally circular cross sections, with portions forming the electrostatic field-concentrators at periodic locations along the length of the filament.

27. The undergarment of claim 21 wherein a plurality of the concentrators comprise a concentrator body and a terminal surface that can be defined by a radius of a circle drawn within the concentrator body, and wherein at least one terminal surface projects saliently from the central bulk of the filament by a distance at least as great as that radius.

28. The undergarment of claim 26, further comprising means for making electrical connection between a filament and the user.

29. The undergarment of claim 21 wherein the filament comprises one or more conductive strands and one or more non-conductive strands, with portions of the conductive strands forming the electrostatic field-concentrators at periodic locations along the length of the filament.

30. The undergarment of claim 21 wherein the filament comprises one or more conductive filaments and one or more conductive strands, with portions of the conductive strands forming the electrostatic field-concentrators at periodic locations along the length of the filament.

31. The undergarment of claim 29 wherein a plurality of the electrostatic field-concentrators comprise a terminal surface having an axial radius, and wherein the terminal surface projects saliently from the central bulk of the filament by a distance at least as great as their axial radius.

32. The undergarment of claim 31, further comprising means for making electrical connection between a filament and the wearer.

33. An undergarment for reducing electric fields upon a wearer, the undergarment comprising:
   a body portion covering at least part of a body area of the wearer;
   electrically conductive means associated with said body portion for attenuating electrical fields, said electrically conductive means comprising a plurality of filaments;
   said filaments defining spaced-apart, electrostatic field-concentrators upon which electrostatic fields concentrate for creating ions that cancel electrostatic charges; and,
   whereby the undergarment protects at least a portion of a body area of the wearer from electrostatic fields.

34. The undergarment of claim 33 wherein a plurality of the filaments have a central bulk, and the electrostatic field-concentrators project saliently away from the filament central bulk.

35. The undergarment of claim 33 further comprising means for establishing at least one path of electrical connection between a plurality of the filaments and the wearer's body.

36. The undergarment of claim 33 wherein a plurality of said filaments comprise electrically conductive strands.

37. The undergarment of claim 33 wherein a plurality of said filaments comprise at least one electrically conductive strand twisted with at least one nonconductive strand.

38. The undergarment of claim 33 wherein a plurality of said filaments comprise at least one electrically conductive filament twisted with at least one electrically conductive strand.

39. A liner for a garment worn by a wearer, the liner comprising:
   at least one layer of a material configured to conform generally with at least part of the portion of the garment overlaying the wearer's torso area, one surface of said layer facing toward an inside portion of at least a part of said garment, and one surface of said layer facing toward at least a part of the torso area of the wearer;
   at least part of said liner comprising an electrically conductive portion;
   at least part of said electrically conductive portion comprising a plurality of spaced-apart electrostatic field-concentrators projecting from the electrically conductive portion, upon which at least some electrostatic fields impinging upon the liner concentrate to thereby create ions for canceling electrostatic charges; and,
   whereby the liner protects at least part of the torso area of the wearer from detrimental influence from electrostatic fields.

40. The liner of claim 39 wherein at least a part of the electrically conductive portion comprises a central bulk and a plurality of said electrostatic-field concentrators comprise a terminal surface having an axial width, and wherein a plurality of said terminal surfaces project saliently from the central bulk of said electrically conductive portion by a distance at least as great as one-half of the terminal surface axial width.

41. The liner of claim 39 wherein at least a part of the conductive portion comprises a filament, said filament comprising conductive strands, with portions of the conductive strands forming at least some of said electrostatic field-concentrators along the length of the filament.

42. The liner of claim 39 wherein at least a part of the conductive portion comprises filaments having a central bulk and providing electrostatic field-concentrators.

43. The liner of claim 39 wherein the electrically conductive portion comprises at least one filament defining a central bulk and a plurality of said electrostatic-field concentrators comprise a terminal surface, and wherein at least one terminal surface projects saliently from the central bulk of the filament.

44. The liner of claim 39 wherein a plurality of said electrostatic-field concentrators comprise a concentrator body and a terminal surface that can be defined by the a radius of a circle drawn within the concentrator body, and wherein at least one terminal surface projects saliently from the central bulk of a filament by a distance at least as great as that radius.

* * * * *